(12) United States Patent
Lee

(10) Patent No.: US 9,746,603 B2
(45) Date of Patent: Aug. 29, 2017

(54) LIGHT GUIDE

(71) Applicant: Cheng-Tao Lee, Kaohsiung (TW)

(72) Inventor: Cheng-Tao Lee, Kaohsiung (TW)

( * ) Notice: Subject to any disclaimer, the term of this patent is extended or adjusted under 35 U.S.C. 154(b) by 0 days.

(21) Appl. No.: 14/334,702

(22) Filed: Jul. 18, 2014

(65) Prior Publication Data

US 2015/0029741 A1    Jan. 29, 2015

(30) Foreign Application Priority Data

Jul. 23, 2013  (TW) .............................. 102126226 A
Jul. 9, 2014   (TW) .............................. 103123677 A

(51) Int. Cl.
  *F21V 7/04*     (2006.01)
  *F21V 8/00*     (2006.01)

(52) U.S. Cl.
  CPC ........... *G02B 6/0096* (2013.01); *G02B 6/001* (2013.01); *G02B 6/0036* (2013.01)

(58) Field of Classification Search
  CPC .. G02B 6/0038; G02B 6/0036; G02B 6/0035; G02B 6/0033; G02B 6/001
  See application file for complete search history.

(56) References Cited

U.S. PATENT DOCUMENTS

| | | | | |
|---|---|---|---|---|
| 5,584,556 A | * | 12/1996 | Yokoyama | G02B 6/0036 349/62 |
| 5,845,038 A | * | 12/1998 | Lundin | G02B 6/001 362/551 |
| 6,712,492 B2 | * | 3/2004 | Shimura | G02B 6/0038 362/551 |
| 7,364,341 B2 | | 4/2008 | Parker et al. | |
| 7,512,300 B2 | * | 3/2009 | Robertson | G02B 6/0006 362/630 |
| 7,712,932 B2 | | 5/2010 | Parker et al. | |
| 8,398,274 B2 | | 3/2013 | Parker et al. | |
| 8,668,371 B2 | | 3/2014 | Parker et al. | |
| 8,870,423 B2 | * | 10/2014 | Mihara | F21S 48/1241 362/507 |

(Continued)

FOREIGN PATENT DOCUMENTS

DE   102011001059 A1   9/2012
JP   H04109702 U       9/1992

(Continued)

*Primary Examiner* — Peggy Neils
*Assistant Examiner* — William N Harris
(74) *Attorney, Agent, or Firm* — Alan D. Kamrath; Kamrath IP Lawfirm, P.A.

(57) ABSTRACT

A light guide includes a body transmittable to light and a plurality of light guiding elements. The body includes a first end face on an end thereof. The body further includes a light emitting portion, a deflecting portion, and two lateral sides. The light emitting portion and the deflecting portion are opposite to each other. Each of the two lateral sides is connected to the light emitting portion and the deflecting portion. The first end face is connected to the deflecting portion and each of the two lateral sides. Each light guiding element includes a curved face. The curved face is a conical surface or a part of the conical surface. The curved face is coupled to the deflecting portion. The light guiding elements can be arranged on the deflecting portion in one or more rows to control the light output directions and to reduce the illuminating angle.

20 Claims, 16 Drawing Sheets

(56) References Cited

U.S. PATENT DOCUMENTS

| | | | |
|---|---|---|---|
| 9,340,149 B2* | 5/2016 | Domini | G02B 6/001 |
| 2002/0080598 A1 | 6/2002 | Parker et al. | |
| 2005/0122591 A1* | 6/2005 | Parker | F21V 5/00 |
| | | | 359/619 |
| 2010/0014315 A1* | 1/2010 | Fujimoto | G02B 6/001 |
| | | | 362/615 |
| 2010/0157619 A1* | 6/2010 | Chinniah | G02B 6/001 |
| | | | 362/551 |
| 2010/0254152 A1* | 10/2010 | Taleb-Bendiab | B60Q 1/0035 |
| | | | 362/551 |
| 2010/0302802 A1 | 12/2010 | Bita et al. | |
| 2011/0170036 A1* | 7/2011 | Ishikawa | G02B 6/0016 |
| | | | 349/65 |
| 2012/0170305 A1* | 7/2012 | Rudek | G02B 6/001 |
| | | | 362/581 |
| 2012/0182757 A1* | 7/2012 | Liang | G02B 6/0006 |
| | | | 362/555 |
| 2014/0293630 A1* | 10/2014 | Domini | G02B 6/001 |
| | | | 362/487 |

FOREIGN PATENT DOCUMENTS

| | | | |
|---|---|---|---|
| JP | 2001215337 A | 8/2001 | |
| JP | 2008515026 A | 5/2008 | |
| JP | 2009269492 A | 11/2009 | |
| JP | 2013080120 A | 5/2013 | |

* cited by examiner

US 9,746,603 B2

LIGHT GUIDE

BACKGROUND OF THE INVENTION

1. Field of the Invention

The present invention relates to a light guide and, more particularly, to a light guide for deflecting light rays from a light source to specific directions to control the light output angle.

2. Description of the Related Art

In recent years, small-size high-luminance power sources, such as light-emitting diodes (LEDs), have been widely used in various lighting devices. Although these lighting devices provide higher luminance, suitable light guides are still required to meet different light output patterns of various products by converting the light rays generated by the light sources into the desired light output patterns of the products. The light guides are used to deflect the light rays generated by the light sources to specific directions to thereby reduce the illuminating angle.

FIG. 1 shows a schematic view of a conventional light guide including a light-transmittable body 9. The body 9 includes a first end face 91, a second end face 92, a light emitting portion 93, a deflecting portion 94, and two lateral sides 95 and 96 connecting the light emitting portion 93 and the deflecting portion 94. The first end face 91 and the second end face 92 respectively form two ends of the body 9. The light emitting portion 93 is connected between the first and second end faces 91 and 92. The deflecting portion 94 is also connected between the first and second end faces 91 and 92. Preferably, the lighting emitting portion 93 and the deflecting portion 94 are opposite to each other.

In use of the conventional light guide, the first end portion 91 receives incident light rays from a light source 971 facing the first end face 91. The second end portion 92 receives light rays from another light source 972 facing the second end face 92. Alternatively, no light is incident to the second end face 92, and there is no need to provide the another light source 972. The light emitting portion 93 emits the light rays. The deflecting portion 94 includes a plurality of transversely extending inclined face structures 98. Each inclined face structure 98 includes a first deflecting face 981 and a second deflecting face 982. The first deflecting face 981 of each inclined face structure 98 faces the second deflecting face 982 of an adjacent inclined face structure 98, such that the first deflecting faces 981 and the second deflecting faces 982 are alternately disposed along the deflecting portion 94 to form a serrated structure. The deflecting portion 94 deflects the light rays to the light emitting portion 93, such that the light rays can be emitted via the light emitting portion 93. The two lateral sides 95 and 96 deflect the light rays back into an interior of the body 9, keeping the light rays inside the body 9 while moving forward until the light rays are emitted via the light emitting portion 93.

FIG. 2 shows the light path of the conventional light guide. A first reference light path L91 is a path of a light ray from the light source 971 that directly hits the first deflecting face 981a after transmitting the first end face 91, and after refection by the first deflecting face 981a, the light ray turns and emits via the light emitting portion 93. A second reference light path L92 is a path of a light ray from the light source 971 that transmits the first end face 91, that is deflected many times in the body 9, and that finally hits another first deflecting face 981z and is subsequently reflected by another first deflecting face 981z, turning the light ray to the light emitting portion 93 where the light ray is emitted. The light source 971 faces the first end face 91. Since the first deflecting face 981a providing reflection in the first reference light path L91 is located adjacent to the first end face 91, the occurrence probability of the first reference light path L91 is high, and the luminance is high. On the other hand, since another first deflecting face 981z in the second reference light path L92 is distant to the first end face 91 and, thus, has a low occurrence probability, the luminance is low. Thus, the luminance distribution of the whole light emitting portion 93 is not uniform. A portion of the light emitting portion 93 adjacent to the first end face 91 could be brighter, and another portion of the light emitting portion 93 distant to the first end face 91 could be darker. If another light source 972 is provided to generate a light ray incident to the second end face 92, the two end portions of the light emitting portion 93 could be brighter, and the central portion of the light emitting portion 93 distant to the first and second end faces 91 and 92 could be darker, also resulting in a non-uniform luminance distribution.

FIG. 3 shows another light path in a portion of the body 9 of the conventional light guide. After the light ray from the light source 971 has transmitted into the body 9 via the first end face 91, the light ray is deflected many times and moves towards the second end face 92 in irregular directions. A third reference light path L93 is a path of a light ray from the light source 971 that directly hits one of the first deflecting faces 981 adjacent to the central area, and after refection by the first deflecting face 981, the light ray turns to the light emitting portion 93 to successfully emit the light ray.

A fourth reference light path L94 is a path of a light ray that directly hits an area of the first deflecting face 981 away from the center, and after refection by the first deflecting face 981, the light ray turns and emits via the light emitting portion 93, resulting in a deviation of the angle while the light ray transmits the light emitting portion 93. Thus, a deviation angle A91 exists between the light emitting directions of the fourth reference light path L94 and the third reference light path L93. Namely, since both the third reference light path L93 and the fourth reference light path L94 exist in the body 9 and since a deviation angle A91 exists between the light emitting directions of the third and fourth reference light paths L93 and L94, the illuminating angle of the light emitting portion 93 is larger and, thus, could not meet the requirements of the light output patterns of specific products.

Furthermore, a fifth reference light path L95 is a path of a light ray that hits an area of the first deflecting face 981 adjacent to the lateral side 96, and after reflection by the first deflecting face 981, the light ray turns to the lateral side 96. When the angle between the light ray and the lateral side 96 is too large (approximating 90°), the light ray will directly transmit outside of the body 9 via the lateral side 96. Thus, light leakage occurs in the lateral sides 95 and 96 of the conventional light guide.

Furthermore, with reference to FIG. 4, a secondary reflection principle is used to improve the uniform luminance distribution of the light emitting portion 93. A sixth reference light path L96 is a path of a light ray transmitting the first end face 91, hitting and passing through the first deflecting face 981 of one of the inclined face structures 98, passing through the second deflecting face 982 of the inclined face structure 98 to the first deflecting face 981 of another inclined face structure 98, and reflected by the first deflecting face 981 of the another inclined face structure 98, turning the light ray to the light emitting portion 93 where the light ray is emitted. Namely, the light ray transmits the deflecting portion 94 via the first deflecting face 981 of the inclined face structure 98 and is subsequently incident into the interior of the body 9 via the second deflecting face 982 of the inclined face structure 98 to be incident to the first deflecting face 981 of another inclined face structure 98, forming a secondary reflection. However, although the secondary reflection can effectively reduce the non-uniform luminance distribution of the light emitting portion 93, the light ray might not be able to return to the interior of the body 9 after transmitting the deflecting portion 94, such that the light ray could directly be emitted to outside of the body 9, causing light leakage at the deflecting portion 94.

In view of the foregoing, since the existence of the first and second reference light paths L91 and L92 causes non-uniform luminance at the light emitting portion 93 that leads to inferior light emitting quality, since the existence of the third and fourth reference light paths L93 and L94 causes an enlarged illuminating angle of the light emitting portion 93 that leads to incapability of application on most lighting devices due to the large illuminating angle of the conventional light guide, and since the existence of the fifth and sixth reference light paths L95 and L96 causes light leakage at the lateral portion 96 or the deflecting portion 94 that leads to a reduction in the light guiding efficiency, improvement to the conventional light guide is necessary.

SUMMARY OF THE INVENTION

An objective of the present invention is to provide a light guide including a plurality of light guiding elements arranged on a deflecting portion of a body. Each light guiding element includes a conical surface and a bottom face connected to the conical surface. The bottom face is coupled to the deflecting portion, and an apex of the conical surface faces a light emitting portion opposite to the deflecting portion, increasing the light receiving probability of the light guiding elements distant to the light source and improving uniform luminance distribution of the light emitting portion.

Another objective of the present invention is to provide a light guide in which by the provision of the conical surface of each light guiding element, and if the light rays from various directions turn and emit via the light emitting portion after deflection by the light guiding elements, the emitting angle of each light ray is distributed surrounding a central axis of a corresponding light guiding element, such that the light output directions of the light rays are less likely to be adversely affected by the conical angles of the conical surfaces of light guiding elements, reducing the illuminating angle of the light emitting portion.

A further objective of the present invention is to provide a light guide in which the conical surface of each light guiding element extends between the light emitting portion and two lateral sides. Thus, a bottom face width of each light guiding element can be smaller than a width of the deflecting portion, allowing the light rays to be transmitted between each light guiding element and the two lateral sides, avoiding the light rays from directly transmitting to the outside of the body after turning to either lateral side. Light leakage can be avoided, and the light leakage rate of the light guide is, thus, reduced.

The present invention fulfills the above objectives by providing a light guide including a body transmittable to light and a plurality of light guiding elements. The body includes a first end face on an end thereof. The body further includes a light emitting portion, a deflecting portion, and two lateral sides. The light emitting portion and the deflecting portion are opposite to each other. Each of the two lateral sides is connected to the light emitting portion and the deflecting portion. The first end face is connected to the deflecting portion and each of the two lateral sides. The plurality of light guiding elements is arranged on the deflecting portion. Each of the plurality of light guiding elements includes a curved face. The curved face is a conical surface or a part of the conical surface. The curved face is coupled to the deflecting portion.

In an embodiment of the light guide according to the present invention, a portion of the curved face connected to the deflecting portion can extend along the deflecting portion to form a bottom face. The bottom face can be a virtual or solid face. The curved face is connected to the bottom face. Each of the plurality of light guiding elements is a cone including the conical surface. The curved face is the conical surface of the cone. The curved face includes an apex facing the deflecting portion.

In the above embodiment of the light guide, a line passes through an apex of the curved face and a geometric center of the bottom face and forms a central axis. A conical angle between the central axis and the curved face is smaller than 80°. The deflecting portion has a width between the two lateral sides. The bottom face of each of the plurality of light guiding elements has a bottom face width in a direction perpendicular to the two lateral sides. The bottom face width is smaller than the width of the deflecting portion. The apex of the curved face has a height from the bottom face, and the height is larger than 0.3 mm.

In an example of the above embodiment of the light guide, each light guiding element is a right circular cone, and the bottom face is circular.

In another example of the above embodiment of the light guide, each light guiding element is an oblique cone. The central axis passing through the apex of the curved face and the geometric center of the bottom face is not perpendicular to the bottom face. The maximal conical angle between the central axis and the curved face is smaller than 80°.

In a further example of the above embodiment of the light guide, each light guiding element is an elliptical cone. The bottom face is elliptic. The maximal bottom face width of the bottom face of each light guiding element perpendicular to the two lateral sides is smaller than the width of the deflecting portion.

In another embodiment of the light guide according to the present invention, a portion of the cured face connected to the deflecting portion can extend along the deflecting portion to form a bottom face. The bottom face can be a virtual or solid face. The curved face is connected to the bottom face. Each of the plurality of light guiding elements further includes a top face. The curved face is connected between the bottom face and the top face. The curved face is a portion of the conical surface. The top face faces the deflecting portion.

In the above embodiment of the light guide, the curved face extends towards the light emitting portion to form the conical surface, such that the curved face has a virtual apex. A line passes through an apex of the curved face and a geometric center of the bottom face and forms a central axis. A conical angle between the central axis and the curved face is smaller than 80°. The deflecting portion has a width between the two lateral sides. The bottom face of each of the plurality of light guiding elements has a bottom face width in a direction perpendicular to the two lateral sides. The bottom face width is smaller than the width of the deflecting portion. The apex of the curved face has a height from the bottom face, and the height is larger than 0.3 mm.

In an example of the above embodiment of the light guide, the top face is a plane, the bottom face is parallel to the top face, and each light guiding element is a trapezoidal cone.

In another example of the above embodiment of the light guide, the top face is a plane or a curved face or includes a rounded angle. The maximal bottom face width of the bottom face of each light guiding element perpendicular to the two lateral sides is smaller than the width of the deflecting portion.

In a further embodiment of the light guide according to the present invention, each of the plurality of light guiding elements further includes a cut face. The curved face extends along the body and faces the first end face. The curved face is a part of the conical surface including an apex. The curved face includes two edges connected to the apex. The apex faces the light emitting portion. The two edges are located on two sides of the curved face. The cut face is connected to the two edges.

In still another embodiment of the light guide according to the present invention, each of the plurality of light guiding elements includes a plurality of cut faces. The plurality of cut faces includes a first cut face and a second cut face connected to the first cut face. The curved face extends along the body towards the first end face. The curved face is a part of the conical surface including an apex. The curved face includes two edges connected to the apex. The apex faces the light emitting portion. The two edges are located on two sides of the curved face. The first cut face is connected to one of the two edges of the curved face. The second cut face is connected to the other of the two edges of the curved face.

In the above embodiment of the light guide, a line passes through an apex of the curved face and a geometric center of the bottom face and forms a central axis. A conical angle between the central axis and the curved face is smaller than 80°. The deflecting portion has a width between the two lateral sides. The bottom face of each of the plurality of light guiding elements has a bottom face width in a direction perpendicular to the two lateral sides. The bottom face width is smaller than the width of the deflecting portion. The apex of the curved face has a height from the bottom face, and the height is larger than 0.3 mm.

In the above embodiment of the light guide, the first cut face and the second cut face have the same area and are symmetric to each other, such that each light guiding element is in the form of a sector-shaped cone.

In the above embodiment of the light guide, the first and second cut faces are connected to the bottom face, respectively, such that the first cut face is at an angle to the second cut face. The angle is in a range between 90° and 180°.

In the light guide according to the present invention, the first end face is adapted to receive incident light rays from a light source, and the light source is adapted to face the first end face.

In an example of the light guide according to the present invention, the body is elongated. A second end face is formed on the other end of the body. The second end face is also connected to the light emitting portion, the deflecting portion, and the two lateral sides. The second end face is adapted to receive light rays from another light source that faces the second end face.

In an example of the light guide according to the present invention, the body is in the form of a loop, and a channel is provided to a section of the body to form the first end face.

In the light guide according to the present invention, the plurality of light guiding elements is different from each other in a direction of the central axis, the conical angle, the bottom face width, the height, or a spacing between two adjacent light guiding elements.

In the light guide according to the present invention, the deflecting portion includes two opposite faces. Each of the plurality of light guiding elements is located on one of the two opposite faces away from the light emitting portion.

In yet another embodiment of the light guide according to the present invention, the plurality of light guiding elements is arranged on the deflecting portion in at least two rows. One of the plurality of light guiding elements in one of the at least two rows is aligned or misaligned with another of the plurality of light guiding elements in another of the at least two rows.

In still another embodiment of the light guide according to the present invention, the curved face of each of the plurality of light guiding elements includes a reflective layer.

In still another embodiment according to the present invention, a light guide includes a body transmittable to light and a plurality of light guiding elements. The body includes a first end face on an end thereof. The body further includes a light emitting portion, a deflecting portion, and two lateral sides. The light emitting portion and the deflecting portion are opposite to each other. Each of the two lateral sides is connected to the light emitting portion and the deflecting portion. The first end face is connected to the deflecting portion and each of the two lateral sides. The plurality of light guiding elements is arranged on the deflecting portion. Each of the plurality of light guiding elements includes a light guiding face having an apex. The light guiding face is comprised of a plurality of connecting faces. Each of the plurality of connecting faces includes a bottom side and two sides. The bottom side has two ends respectively connected to the two sides. Each of the two sides has an end located distant to the bottom side and connected to the apex. The bottom side is a line passing through two points on an arc. Two bottom sides respectively of two adjacent connecting faces are connected to each other. The light guiding face is coupled to the deflecting portion.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

DETAILED DESCRIPTION OF THE INVENTION

The term "conical surface" referred to hereinafter means a curved face formed by a group of lines each passing through an apex and an arbitrary point of a spatial curve (such as a circle or ellipse) in a three dimensional space, with the spatial curve excluding the apex, and which can be appreciated by one having ordinary skill in the art.

The term "part of a conical surface" referred to hereinafter means a spatial, curved face formed by any part of a conical surface. The conical surface can be expressed by an equation, and any point on the part of the conical surface fulfills the equation. As an example, the following equation (1) can be used as an equation for a conical surface:

$$\frac{x^2}{a^2} + \frac{y^2}{b^2} - \frac{z}{c^2} = 0 \tag{1}$$

wherein when a=b, the above equation (1) represents a right circular cone. Thus, any point on the part of the right circular cone fulfills the above equation (1) and a=b, which can be appreciated by one having ordinary skill in the art.

Figure 1:
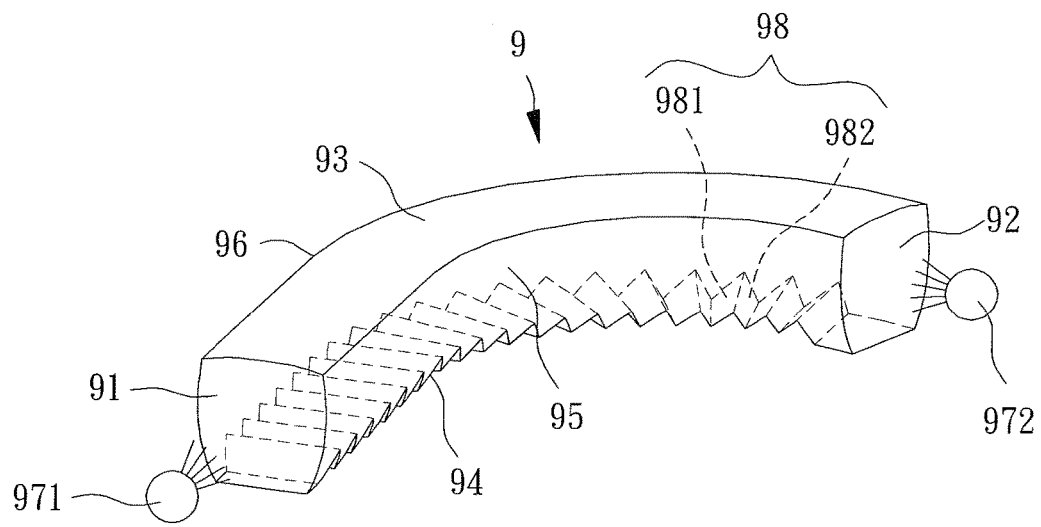
FIG. 1 is a schematic, perspective view of a conventional light guide.
Figure 2:
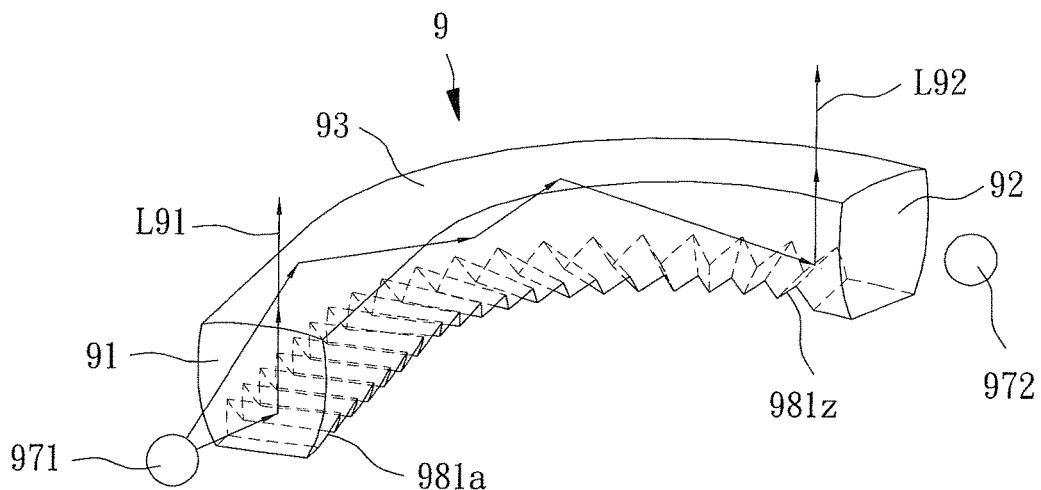
FIG. 2 is a schematic, perspective view illustrating a light path of the conventional light guide.
Figure 3:
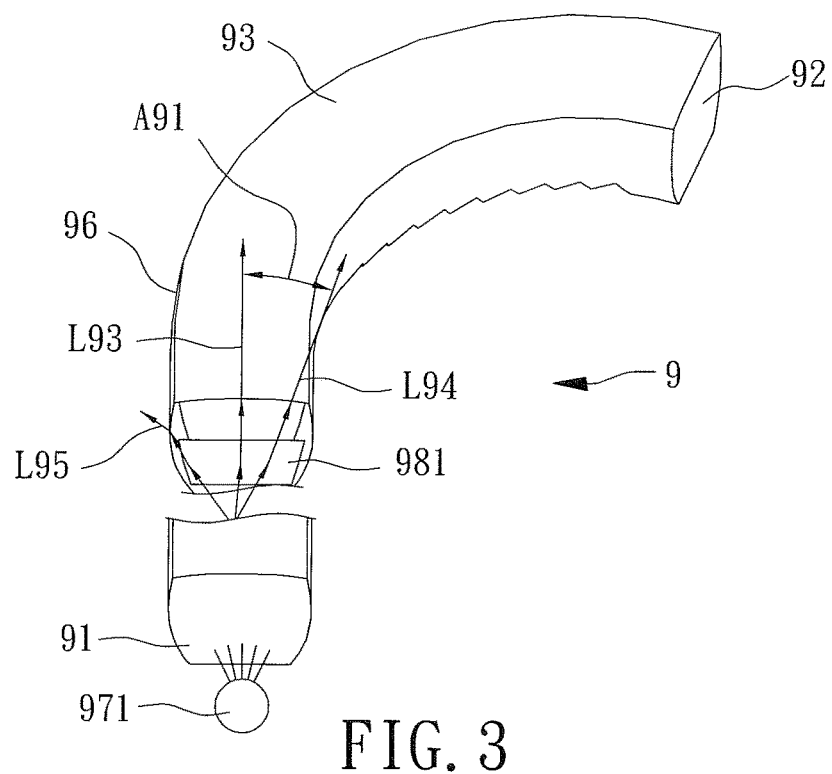
FIG. 3 is a schematic, perspective view illustrating another light path of the conventional light guide.
Figure 4:
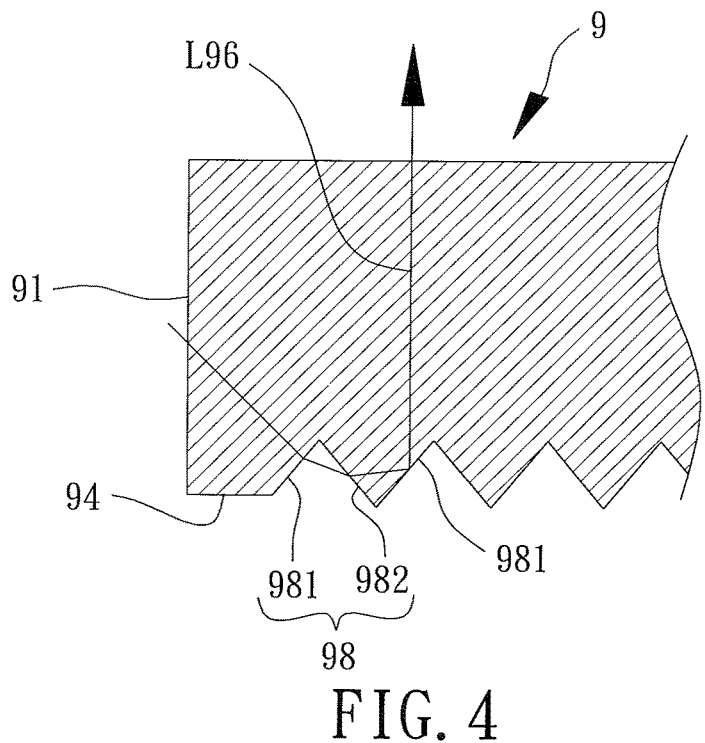
FIG. 4 is a schematic cross sectional view illustrating secondary reflection of a conventional light guide.
Figure 5:
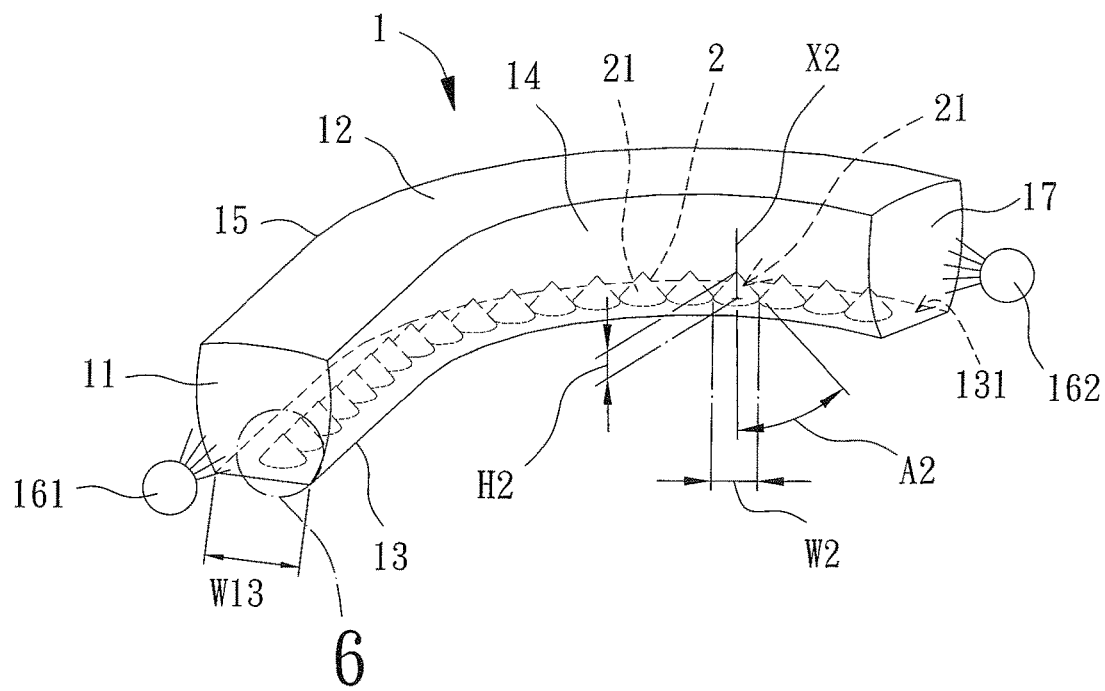
FIG. 5 is a schematic, perspective view of a light guide of a first embodiment according to the present invention.

FIG. 5 is a schematic, perspective view of a light guide of a first embodiment according to the present invention. The light guide includes a body 1 transmittable to light and a plurality of light guiding elements 2. The light guiding elements 2 are arranged in the body 1. The body 1 includes a first end face 11 on an end thereof. The body 1 further includes a light emitting portion 12, a deflecting portion 13, and two lateral sides 14 and 15 connected to the light emitting portion 12 and the deflecting portion 13. The light emitting portion 12 and the deflecting portion 13 can be opposite to each other with the deflecting portion 13 having two opposite faces 131 and 132, with the face 131 facing the light emitting portion 12 and with the face 132 facing away from the light emitting portion 12. The two lateral sides 14 and 15 can be connected to two sides of the deflecting portion 13, such that the body 1 forms a sealed tube. The body 1 can be made of a plastic material or other light-transmittable material, such that the body 1 forms a light-transmittable transparent tube. Furthermore, each of the light emitting portion 12, the deflecting portion 13, and the two lateral sides 14 and 15 can be a plane or a curved face in a three dimensional space. The present invention is not limited to these. The first end face 11 can be an opening or a light-transmitting layer. The first end face 11 is connected to the deflecting portion 13 and each of the two lateral sides 14 and 15.

Figure 6:
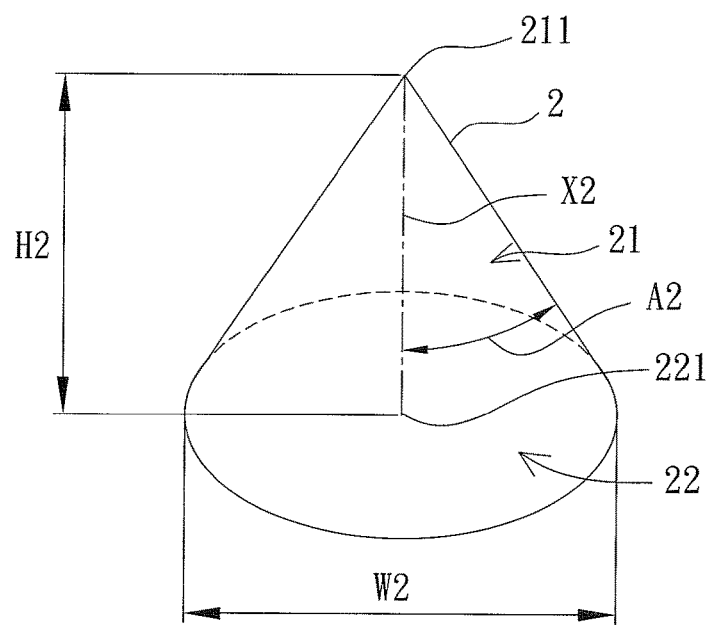
FIG. 6 is an enlarged, schematic, perspective view of a light guiding element of the light guide of the first embodiment according to the present invention.

FIG. 6 is an enlarged, schematic, perspective view of one of the light guiding elements 2. The light guiding elements 2 are arranged on the face 131 of the deflecting portion 13 and are spaced from each other at regular or irregular intervals. Each light guiding element 2 includes a curved face 21 that can extend to form a conical surface. Namely, the curved face 21 can be the conical surface itself or a part of the conical surface. The curved face 21 is coupled to the deflecting portion 13.

Figure 7A:
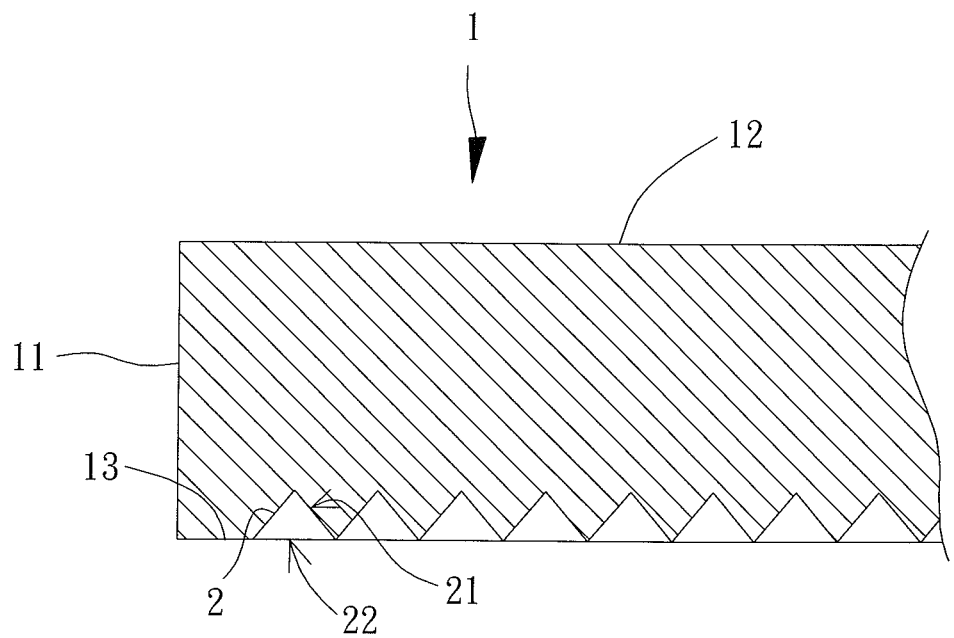
FIG. 7a is a schematic cross sectional view illustrating formation of the light guiding elements of the light guide of the first embodiment according to the present invention.
Figure 7B:
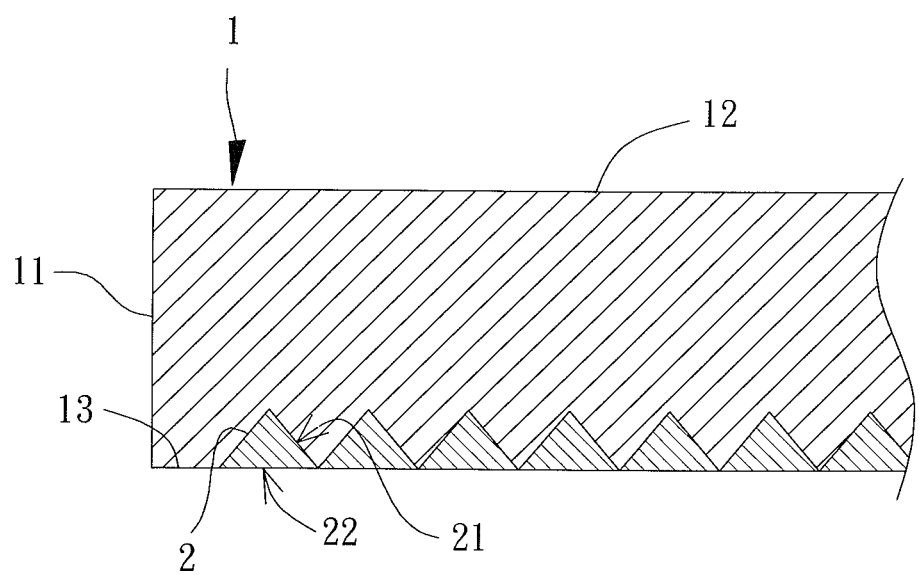
FIG. 7b is a schematic cross sectional view illustrating another example of formation of the light guiding elements of the light guide of the second embodiment according to the present invention.

A portion of the curved face 21 connected to the deflecting portion 13 extends along the deflecting portion 13 and forms a bottom face 22. Namely, with reference to FIG. 7a, in this embodiment, the body 1 can be a solid tube made of a light-transmittable material. Furthermore, a portion of the deflecting portion 13 of the body 1 facing the light emitting portion 12 is removed to form the curved face 21, such that each light guiding element 2 is integrally formed in the deflecting portion 13. Thus, the portion of the curved face 21 connected to the deflecting portion 13 (i.e., the portion of the curved face 21 away from the light emitting portion 12) forms an open end. However, the open end can be a virtual face in an extending direction of the deflecting portion 13, and the virtual face is the bottom face 22, which can be appreciated by one having ordinary skill in the art. Alternatively, with reference to FIG. 7b, each light guiding element 2 can be a cone including the curved face 21, and the bottom face 22 can be connected to the deflecting portion 13. Thus, the bottom face 22 can be a virtual or solid face formed by the portion of the curved face 21 connected to the deflecting portion 13. The present invention is not limited by this.

In the light guide of the first embodiment according to the present invention, each light guiding element 2 is a cone, and the curved face 21 is the conical surface of the cone. In an example, each light guiding element 2 is a right circular cone, and the bottom face 22 is a circle. The curved face 21 includes an apex 211 facing the light emitting portion 12. Furthermore, a line passes through an apex 211 of the curved face 21 and a geometric center 221 of the bottom face 22 and forms a central axis X2, and a conical angle A2 is formed between the central axis X2 and the curved face 21. Furthermore, the deflecting portion 13 has a width W13 between the two lateral sides 14 and 15. The bottom face 22 of each light guiding element 2 has a bottom face width W2 in a direction perpendicular to the two lateral sides 14 and 15. The apex 211 of the curved face 21 has a height H2 from the bottom face 22. Considering the manufacturing convenience and the light guiding effect of the light guide of the first embodiment, the optimal design includes: the conical angle A2 between the central axis X2 and the curved face 21 is smaller than 80°, the bottom face width W2 is smaller than the width W13 of the deflecting portion 13, and the height H2 is larger than 0.3 mm.

In use of the light guide of the first embodiment according to the present invention, the first end face 11 is adapted to receive incident light rays from a light source 161. The light source 161 is adapted to face the first end face 11. The light emitting portion 12 emits the light rays. Since the light guiding elements 2 are arranged on the deflecting portion 13, the deflecting portion 13 can use the light guiding elements 2 to deflect the light rays to the light emitting portion 12, permitting the light rays to emit via the light emitting portion 12. The two lateral sides 14 and 15 deflect the light rays back into an interior of the body 1, keeping the light rays to move forward in the interior of the body 1 until the light rays are emitted via the light emitting portion 12.

Figure 8:
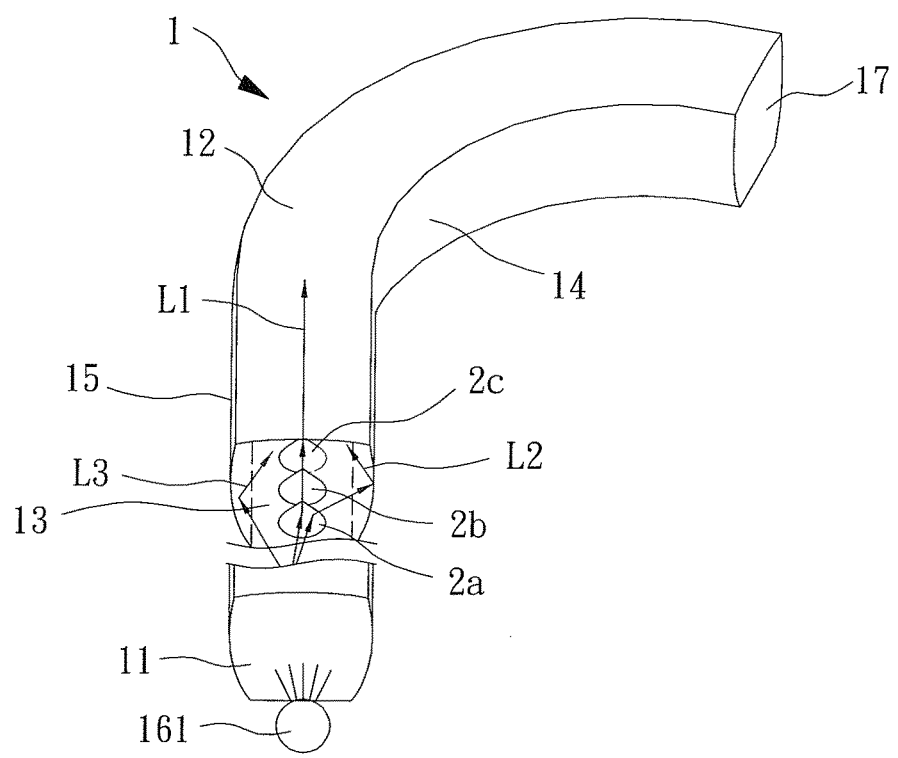
FIG. 8 is a schematic, perspective view illustrating light paths of the light guide of the first embodiment according to the present invention.

FIG. 8 is a schematic, perspective view illustrating light paths of the light guide of the first embodiment according to the present invention. Specifically, after incident into the body 1 via the first end face 11, the light rays deflect many times in the interior of the body 1 and move forward along the body 1 in irregular directions. The light guiding elements 2 include a first light guiding element 2a, a second light guiding element 2b, and a third light guiding element 2c. The first, second, and third light guiding elements 2a, 2b, and 2c are continuously arranged in a row, and the first light guiding element 2a is closest to the first end face 11.

A first light path L1 is a path of a light ray that directly hits an area of the curved face 21 of the first light guiding element 2a adjacent to a central axis X2 of the first light guiding element 2a, and the light is then reflected by the curved face 21, such that the light ray turns to the light emitting portion 12 to normally emit the light ray. A second light path L2 is a path of a light ray that hits an area of the curved face 21 of the first light guiding element 2a deviated from the central axis X2. Since the curved face 21 is a curved face in a three dimensional space and since the conical angle A2 of the first light guiding element 2a is smaller than 80°, the light ray will not deflect to the light emitting portion 12. Instead, the light ray deflects to the rear of the first light guiding element 2a after reflection by the lateral side 14, such that the light ray can keep moving forward along the body 1 to contact the second light guiding element 2b or the third light guiding element 2c behind the first light guiding element 2a. Note that whether an area of the curved face 21 of each light guiding element 2 is adjacent to or deviated from the central axis X2 is decided according to the moving direction of the light. As an example, when the light ray is incident to and hits the curved face 21 of a light guiding element 2 in a moving direction, the area of the light guiding element 2 hit by the light ray is adjacent to the central axis X2 if the moving direction points to the central axis X2 of the light guiding element 2. On the other hand, when the light ray is incident to and hits the cured face 21 of a light guiding element 2 in another moving direction, the area of the light guiding element 2 hit by the light ray deviates from the central axis X2 if another moving direction does not point to the central axis X2 of the light guiding element 2, which can be appreciated by one having ordinary skill in the art. Since the bottom face width W2 is smaller than the width W13 of the deflecting portion 13, the light ray can transmit between each light guiding element 2 and the two lateral sides 14 and 15. A third light path L3 is a path of a light ray that hits a portion of the lateral side 15 adjacent to the first light guiding element 2a, and the light ray turns to the rear of the light guiding element 2a after deflection by the lateral side 15, such that the light ray can keep moving forward along the body 1 to contact the second light guiding element 2b or the third light guiding element 2c behind the first light guiding element 2a.

Although the light rays of each of the first, second, and third light paths L1, L2, and L3 hit the first light guiding element 2a or a portion of the first light guiding element 2a, and since the curved face 21 is a conical surface, only the first light path L1 hitting the area of the curved face 21 of the first guiding element 2a adjacent to the central axis X2 thereof can emit via the light emitting portion 12. On the other hand, either the second light path L2 hitting the area of the curved face 21 of the first light guiding element 2a deviated from the central axis X2 thereof or the third light path L3 hitting either of the two lateral sides 14 and 15 deflects the light rays to the rear of the first light guiding element 2a, such that the light rays can keep moving forward along the body 1 to contact the other light guiding elements 2 behind the first light guiding element 2a. Thus, the second and third light paths L2 and L3 permit more light rays to reach the other light guiding elements 2a away from the first end face 11. Compared to the conventional light guide in which the light rays deflect to the light emitting portion 93 to emit such that a portion of the light emitting portion 93 adjacent to the first end face 91 is brighter and such that another portion of the light emitting portion 93 adjacent to the second end face 92 is darker, the light guide of the first embodiment according to the present invention includes the provision of the light guiding elements 2 in the form of cones and mounted in the deflecting portion 13 to utilize the curved face 21 of each light guiding element 2 and the gaps between each light guiding element 2 and the two lateral sides 14 and 15 to thereby increase the light receiving probability of the light guiding elements 2 distant to the first end face 11, effectively obviating non-uniform luminance distribution of the light emitting portion 93 of the conventional light guide and, thus, effectively improving uniform luminance distribution of the light emitting portion 12.

However, to assure that the light guiding elements 2 of the light guide of the first embodiment provide the light emitting portion 12 with an effect of increased uniform luminance distribution, the light guiding elements 2 can be different from each other in the direction of the central axis X2, the conical angle A2, the bottom face width W2, the height H2, or a spacing between two adjacent light guiding elements 2 to provide the desired light output patterns of various products.

Still referring to FIG. 8, the light ray of each of the first and second light paths L1 and L2 hits the first light guiding element 2a. However, only the first light path L1, with the light ray hitting the area of the curved face 21 of the first light guiding element 2a adjacent to the central axis X2 thereof, can emit via the light emitting portion 12. On the other hand, the second light path L2 whose light hitting the area of the curved face 21 of the first light guiding element 2a deviated from the central axis X2 thereof deflects the light ray to the rear of the first light guiding element 2a to contact the other light guiding elements 2 behind the first light guiding elements 2a, assuring a smaller illuminating angle of the light emitting portion 12.

Figure 9:
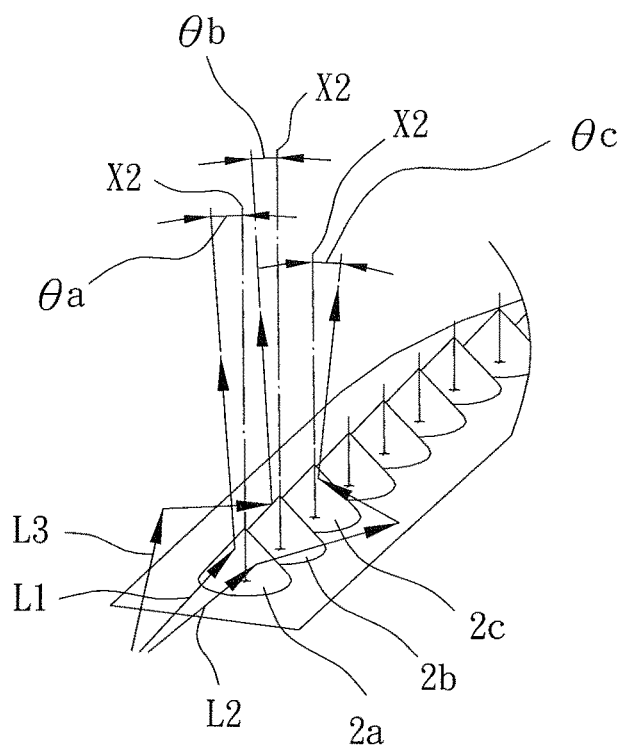
FIG. 9 is a partial, perspective view illustrating the light paths of the light guide of the first embodiment according to the present invention.

FIG. 9 is a partial, perspective view illustrating the light paths of the light guide of the first embodiment according to the present invention. More specifically, regarding the first light path L1, when the light ray hits the curved face 21 of the first light guiding element 2a and is reflected by the curved face 21 to the light emitting portion 12, an angle of departure θa exists between the light output direction and the central axis X2 of the first light guiding element 2a. Regarding the second light path L2, after hitting the first light guiding element 2a, if the light ray deflects to the rear of the first light guiding element 2a and hits the curved face 21 of the third light guiding element 2c and is subsequently deflected by the curved face 21 to the light emitting portion 12, an angle of departure θc exists between the light output direction and the central axis X2 of the third light guiding element 2c. Regarding the third light path L3, if the light ray hits a portion of the lateral side 15 adjacent to the first light guiding element 2a, deflects to the rear of the first light guiding element 2a, hits the curved face 21 of the second light guiding element 2b, and is subsequently reflected by the curved face 21 to the light emitting portion 12, an angle of departure θb exists between the light output direction and the central axis X2 of the second light guiding element 2b. Namely, since the curved face 21 of each light guiding element 2 is a conical surface, light rays from different directions can be reflected by the first, second, or third light guiding element 2a, 2b, or 2c. If the light rays deflect to the light emitting portion 12 and, thus, emit via the light emitting portion 12, each light ray is distributed around the central axis X2 of a corresponding light guiding element 2 by an angle of departure θa, θb, θc. Thus, the light output directions of the light rays can be controlled by using the direction of the central axis X2 of each light guiding element 2. Furthermore, by designing the size of each light guiding element 2 and the curvature of the curved face 21 thereof, the angle of departure θa, θb, θc between the light output direction and the corresponding light guiding element 2 can be adjusted to reduce the illuminating angle of the light emitting portion 12.

Compared to the conventional light guide in which the light output directions are adversely affected by the angles of the light rays incident to the first deflecting face 981 and, hence, causes a larger illuminating angle of the light emitting portion 93 resulting from a deviation angle A91 between the light output directions of the third and four reference light paths L93 and 94, it can be appreciated that the light guide of the first embodiment according to the present invention reflects the light rays to the light emitting portion 12 by the curved face 21 of the light guiding elements 2, such that the light output directions of the light rays are controlled to be within a range of angle with respect to the central axis X2 of the corresponding light guiding element 2 without adverse effect by the angle of the curved face 21 of each light guiding element 2. Thus, the light output directions can effectively be controlled to achieve the effect of reducing the illuminating angle of the light emitting portion 12.

Furthermore, since the curved face 21 of each light guiding element 2 can extend to a location between the light guiding element 2 and the two lateral sides 14 and 15, the bottom face width W2 can be set to be smaller than the width W13 of the deflecting portion 13, such that the light rays can transmit between the light guiding element 2 and the two lateral sides 14 and 15. Thus, as indicated by the first light path L1, when the light ray hits a portion of either of the two lateral sides 14 and 15 adjacent to a light guiding element 2, the lateral side 14 or 15 deflects the light ray to the rear of the light guiding element 2, such that the light ray can keep moving forward along the body 1. Compared to the conventional light guide in which the first deflecting face 981 and the second deflecting face 982 of each inclined face structure 98 cannot reflect the light rays between the inclined face structure 98 and the lateral sides 95 and 96, such that the inclined face structure 98 must abut the lateral sides 95 and 96 to avoid the light rays from entering between the inclined face structure 98 and the lateral sides 95 and 96 and, hence, causing light leakage in which the light rays hit an area of the first deflecting face 981 adjacent to the lateral side 96, are reflected by the first deflected face 981, and turn to the lateral side 96 where the light rays are directly emitted to the outside of the body 9, the light guide of the first embodiment according to the present invention indeed reduces the light leakage rate of the light guide.

Note that the body 1 of the light guide of the first embodiment according to the present invention can be elongated, such that a second end face 17 can be formed on the other end of the body 1. The second end face 17 can be an opening or a light-transmittable layer. Also, the second end face 17 is connected to the light emitting portion 12, the deflecting portion 13, and the two lateral sides 14 and 15. The second end face 17 is adapted to receive light rays from another light source 162. The another light source 162 faces the second end face 17, which can be appreciated by one having ordinary skill in the art.

Figure 10:
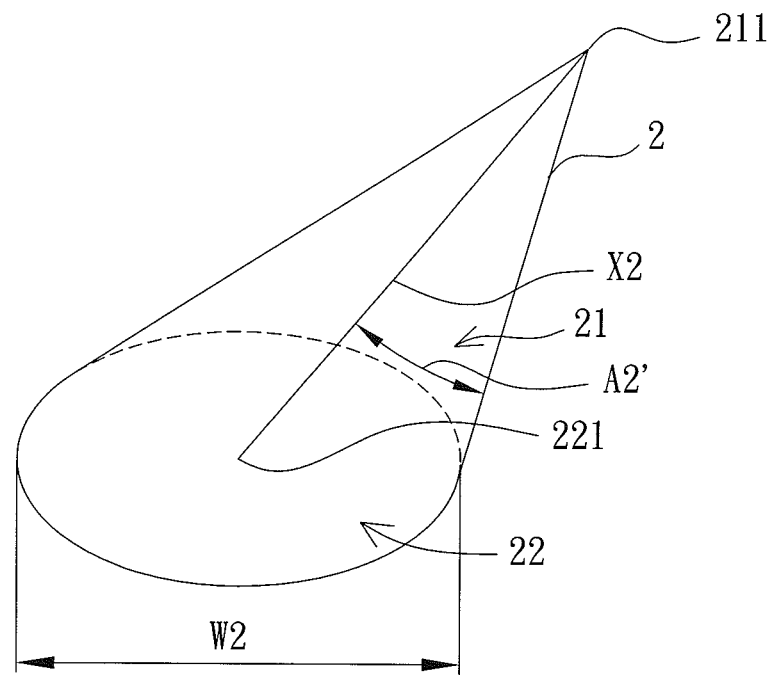
FIG. 10 is an enlarged, schematic, perspective view of another example of the light guiding element of the light guide of the first embodiment according to the present invention.

FIG. 10 is an enlarged, schematic, perspective view of another example of the light guiding element 2 of the light guide of the first embodiment according to the present invention. In this example, each light guiding element 2 is an oblique cone. Similarly, a line passes through the apex 211 of the curved face 21 and a geometric center 221 of the bottom face 22 and forms a central axis X2. The difference between this example and the right circular cone of the above example is that that central axis X2 is not perpendicular to the bottom face 22. Thus, the conical angle A2 between the central axis X2 and the curved face 21 is in a range. However, the maximal conical angle A2' between the central axis X2 and the curved face 21 is smaller than 80°. It is known to control the light output direction by using the orientation of the central axis X2 of each light guiding element 2. By shaping each light guiding element 2 to be an oblique cone, the orientation design of the central axis X2 can be more flexible and, thus, allow easier adjustment in the control of the light output direction.

Figure 11:
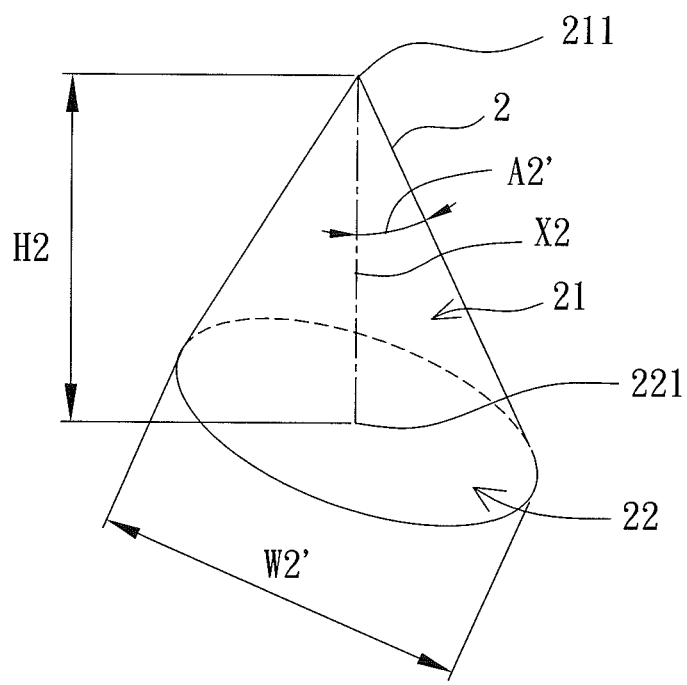
FIG. 11 is an enlarged, schematic, perspective view of a further example of the light guiding element of the light guide of the first embodiment according to the present invention.

FIG. 11 is an enlarged, schematic, perspective view of a further example of the light guiding element 2 of the light guide of the first embodiment according to the present invention. In this example, each light guiding element 2 is in the form of an elliptical cone. Thus, the bottom face 22 is elliptic. Thus, the conical angle A2 between the central axis X2 and the curved face 21 is in a range. However, the maximal conical angle A2' between the central axis X2 and the curved face 21 is smaller than 80°. Furthermore, since the bottom face 22 is elliptic, the bottom face width W2 of the bottom face 22 of each light guiding element 2 is also in a range. The maximal bottom face width W2' perpendicular to the two lateral sides 14 and 15 is smaller than the width W13 of the deflecting portion 13. By shaping each light guiding element 2 to be an elliptical cone, the orientation design of the central axis X2 can be more flexible and, thus, allow adjustment of the light output pattern of the light emitting portion 12.

Figure 12:
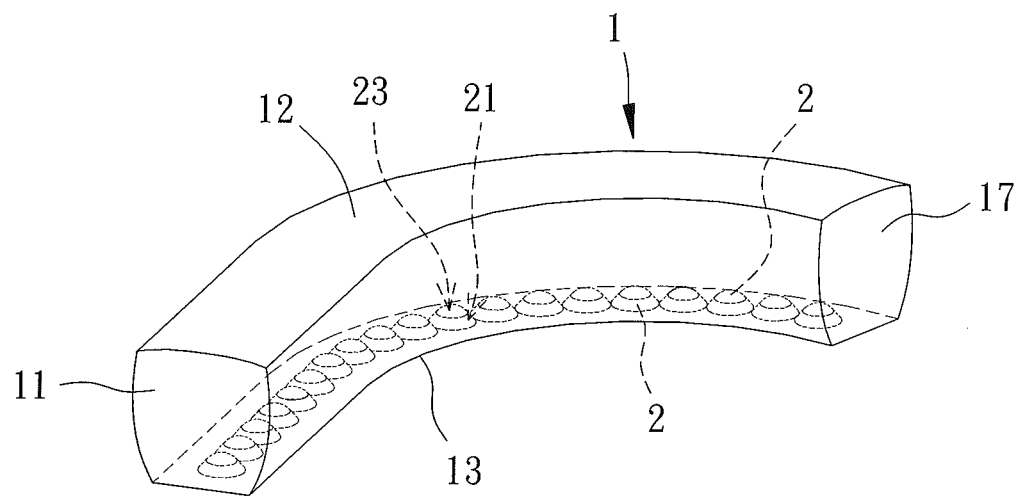
FIG. 12 is a schematic, perspective view of a light guide of a second embodiment according to the present invention.
Figure 13:
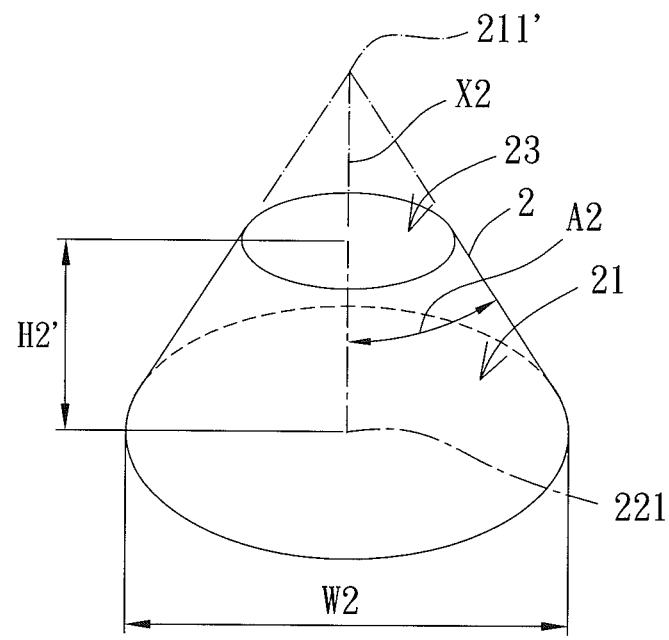
FIG. 13 is an enlarged, schematic, perspective view of a light guiding element of the light guide of the second embodiment according to the present invention.

FIGS. 12 and 13 show a light guide of a second embodiment according to the present invention. The differences between the second embodiment and the first embodiment are that each light guiding element 2 includes a curved face 21 and a top face 23 connected to the curved face 21. The curved face 21 can extend towards the top face 23 to form a conical surface. Thus, the curved face 21 is a portion of the conical surface without the apex. Specifically, the curved face 21 can be a lower portion of a conical surface. A portion of the curved face 21 connected to the deflecting portion 13 forms a bottom face 22. The curved face 21 is connected between the bottom face 22 and the top face 23. The top face 23 faces the deflecting portion 13. The top face 23 can be a plane, and the bottom face 22 can be parallel to the top face 23. Namely, the top face 23 can be a cross sectional face perpendicular to the central axis X2, and each light guiding element 2 is in the form of a trapezoidal cone. However, the top face 23 can be a curved face or can include a rounded angle. The present invention is not limited by these. Although the curved face 21 is a lower portion of a conical surface, the curved face 21 can extend towards the light emitting portion 12 beyond the top face 23 to form the conical surface. Thus, the curved face 21 has a virtual apex 211'. A line passes through an apex 211 of the curved face 21 and a geometric center 221 of the bottom face 22 and forms a central axis X2. A conical angle A2 is formed between the central axis X2 and the curved face 21 and is smaller than 80°. Furthermore, the virtual apex 211' of the curved face 21 has a height H2 from the bottom face 22, and the height H2 is larger than 0.3 mm. In a case that the bottom face 22 is not parallel to the top face 23, the height H2 has a range, and the maximal height H2' between the top face 23 and the bottom face 22 is larger than 0.3 mm. In the light guide of the first embodiment according to the present invention in which each light guiding element 2 is a right circular cone, the area of a portion of the curved face 21 close to the apex 211 is relatively small and, thus, provides a limited effect in reflecting the light. Nevertheless, a portion of each light guiding element 2 in this embodiment close to the apex is cut to form the top face 23, saving the manufacturing material and reducing difficulties in forming the mold. Although the curved face 21 is merely a part of the conical surface, the curved face 21 still has the same curvature as the conical surface and, thus, provides the same reflecting effect as the whole conical surface, which can be appreciated by one having ordinary skill in the art.

Figure 14:
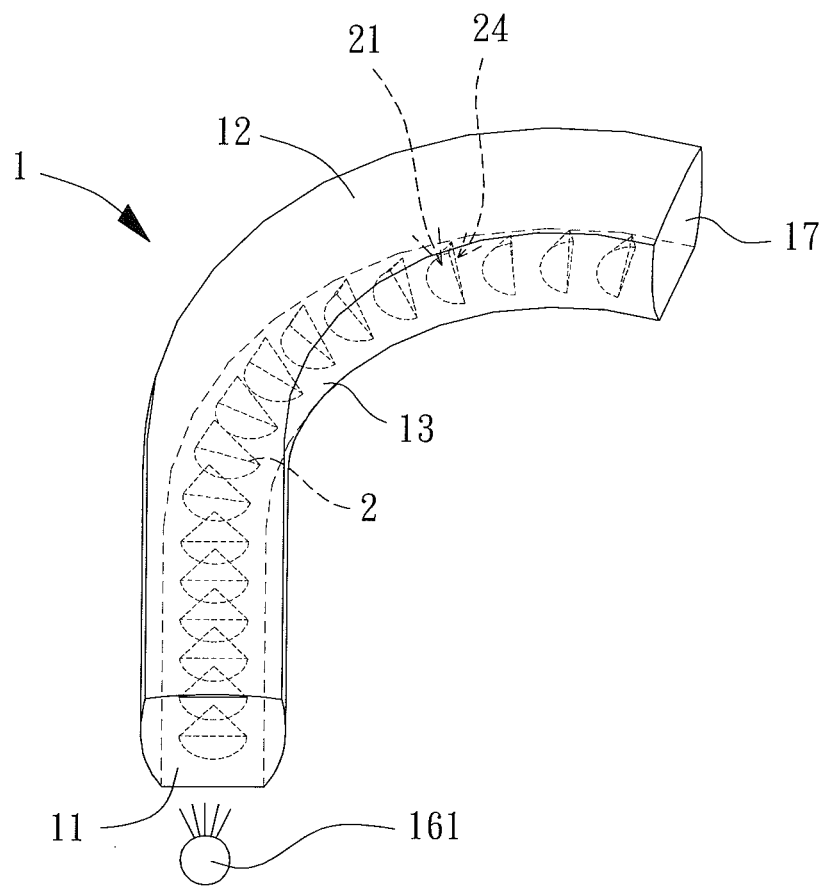
FIG. 14 is a schematic perspective view of a light guide of a third embodiment according to the present invention.
Figure 15A:
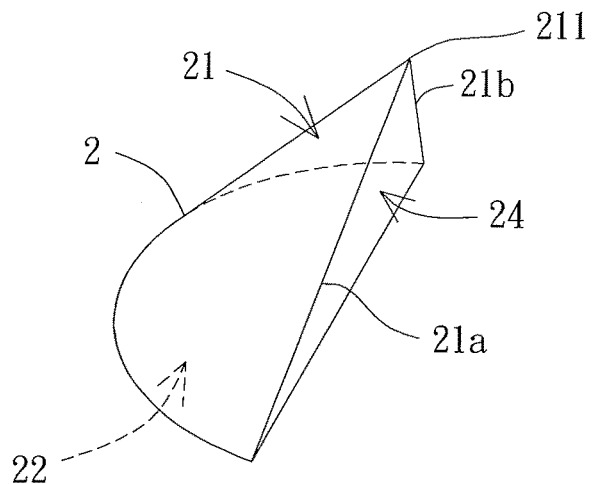
FIG. 15a is an enlarged, schematic, perspective view of a light guiding element of the light guide of the third embodiment according to the present invention.

FIGS. 14 and 15a show a light guide of a third embodiment according to the present invention. The difference between the third embodiment and the first embodiment are that each light guiding element 2 includes a curved face 21 and a cut face 24. The curved face 21 extends along the body 1 and faces the first end face 11. The cut face 24 faces the curved face 21 of another light guiding element 2. The curved face 21 includes an apex 211 and two edges 21a and 21b. The apex 211 faces the light emitting portion 12. The two edges 21a and 21b are located on two sides of the curved face 21, and the cut face 24 is connected to the two edges 21a and 21b. The curved face 21 can extend around the apex 211 to form a conical surface. Namely, the curved face 21 is a part of the conical surface including the apex 211 (such as a half conical surface).

A portion of the curved face 21 connected to the deflecting portion 13 forms a bottom face 22. The cut face 24 is a face extending from the apex 211 towards the bottom face 22. The bottom face 22 has a bottom face width W2 perpendicular to the two lateral sides 14 and 15. The bottom face 22 can be semi-circular or of a geometric shape having an arcuate outer side. Thus, the bottom face width W2 has a range. The bottom face 22 has a maximal bottom face width W2' perpendicular to the two lateral sides 14 and 15. The maximal bottom face width W2' is smaller than the width W13 of the deflecting portion 13. The apex 211 of the curved face 21 has a height H2 from the bottom face 22, and the height H2 is larger than 0.3 mm.

Figure 15B:
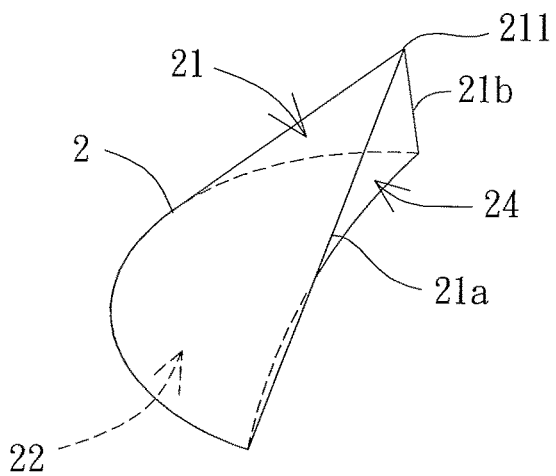
FIG. 15b is an enlarged, schematic, perspective view of another example of the light guiding element of the light guide of the third embodiment according to the present invention.
Figure 15C:
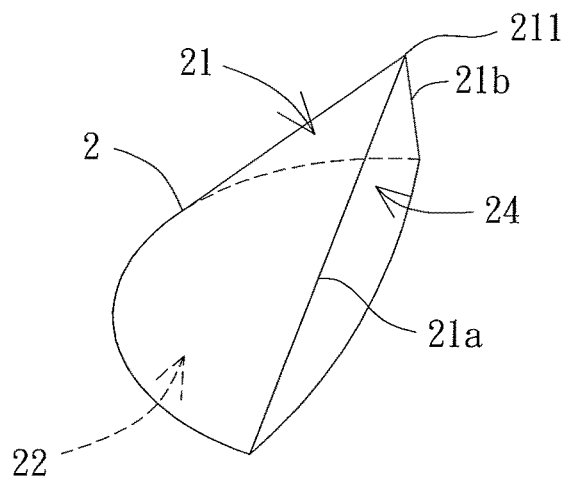
FIG. 15c is an enlarged, schematic, perspective view of a further example of the light guiding element of the light guide of the third embodiment according to the present invention.

The cut face 24 shown in FIG. 15a is a plane and can be perpendicular to the bottom face 22. Namely, the top face 23 can be a cross sectional face parallel to the central axis X2, such that the top face 23 is perpendicular to the bottom face 22 and such that each light guiding element 2 is in the form of a half cone (half elliptical cone). However, the cut face 24 does not have to be perpendicular to the bottom face 22. Alternatively, as shown in FIG. 15b, the cut face 24 can be a concave face that curves towards the curved face 21. In another example shown in FIG. 15c, the cut face 24 is a concave face that curves away from the curved face 21. The present invention is not limited to these.

Figure 16:
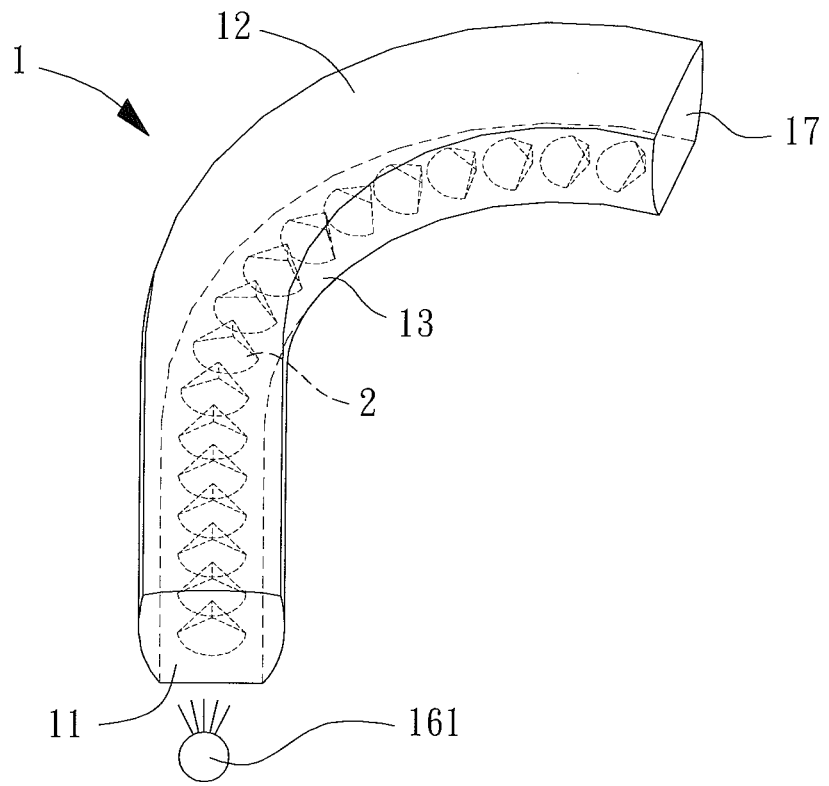
FIG. 16 is a schematic, perspective view of a light guide of a fourth embodiment according to the present invention.
Figure 17:
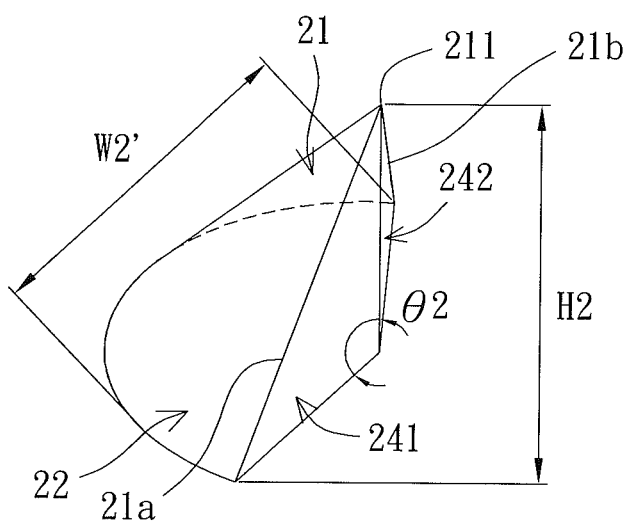
FIG. 17 is an enlarged, schematic, perspective view of a light guiding element of the light guide of the fourth embodiment according to the present invention.

FIGS. 16 and 17 show a light guide of a fourth embodiment according to the present invention. The differences between the fourth embodiment and the third embodiment are that each light guiding element 2 includes a plurality of cut faces. Specifically, in this embodiment, each light guiding element 2 includes a curved face 21, a first cut face 241, and a second face 242 connected to the first face 241. The first and second cut faces 241 and 242 face the curved face 21 of an adjacent light guiding element 2. The curved face 21 includes an apex 211 and two edges 21a and 21b connected to the apex 211. The apex 211 faces the light emitting portion 12. The two edges 21a and 21b are located on two sides of the curved face 21. The first cut face 241 is connected to one of the two edges 21a and 21b of the curved face 21, and the second cut face 242 is connected to the other of the two edges 21a and 21b of the curved face 21. The curved face 21 can extend around the apex 211 to form a conical surface. Namely, the curved face 21 is a part of the conical surface including the apex 211. The first cut face 241 and the second cut face 242 can have the same area and can be symmetric to each other, such that each light guiding element 2 is in the form of a sector-shaped cone. However, the present invention is not limited to these.

A portion of the curved face 21 connected to the deflecting portion 13 forms a bottom face 22. Each of the first and second cut faces 241 and 242 is a face extending from the apex 211 towards the bottom face 22. The bottom face 22 has a bottom face width W2 perpendicular to the two lateral sides 14 and 15. The bottom face 22 can be a sector or of a geometric shape having an arcuate outer side. Thus, the bottom face width W2 has a range. The bottom face 22 has a maximal bottom face width W2' perpendicular to the two lateral sides 14 and 15. The maximal bottom face width W2' is smaller than the width W13 of the deflecting portion 13. The apex 211 of the curved face 21 has a height H2 from the bottom face 22, and the height H2 is larger than 0.3 mm.

Furthermore, the first and second cut faces 241 and 242 can be connected to the bottom face 22, respectively, such that the first cut face 241 is at an angle θ2 to the second cut face 242. The angle θ2 can be in a range between 90° and 180°. In a case that the angle θ2 is 180°, the first and second cut faces 241 and 242 together form a continuous plan, such that the light guiding element 2 is in the form of a half cone of the third embodiment. Similar to the third embodiment, the first cut face 241 or the second cut face 242 can be concave or can be convex or a curved face of any other shape. The present invention is not limited to these.

For a light guide using a single light source 161, the light source 161 faces the first end face 11. When the light guiding elements 2 are arranged on the deflecting portion 13, when two adjacent light guiding elements 2 are closer, the light rays emitted via the light emitting portion 12 easily form a continuous light band. However, if two adjacent light guiding elements 2 are too close to each other, one of the two light guiding elements 2 closer to the first end face 11 has a poorer reflecting effect at the face facing away from the light source and, moreover, tends to block the light confronting face of the light guiding element 2 distant to the first end face 11. According to the structure of the light guiding elements 2 in the third and fourth embodiments, the cut face 24 or the first and second cut faces 241 and 242 can be formed on a side of the light guiding element 2. The cut face 24 or the first and second cut faces 241 and 242 face the curved face 21 of an adjacent light guiding element 2. Namely, the light guiding element 2 can be deemed as a cone obtained by cutting along the cut face 24 or the first and second cut faces 241 and 242. Thus, the curved face 21 can still provide the function of reflecting the light rays. Formation of the cut face 24 or of the first and second cut faces 241 and 242 avoids the curved face 21 of a light guiding element 2 from blocking the curved face 21 of another light guiding element 2, obtaining a better light guiding efficiency. Although the curved face 21 is only a part of the conical surface, the curved face 21 still has the curvature corresponding to the conical surface and, thus, provides the same reflecting effect as the whole conical surface, which can be appreciated by one having ordinary skill in the art.

Since each light guiding element 2 of the third embodiment can be deemed as a cone formed by cutting along the cut face 24, the conical angle (not shown) of each light guiding element 2 is also smaller than 80°. Likewise, since each light guiding element 2 of the fourth embodiment can be deemed as a cone formed by cutting along the first and second cut faces 241 and 242, the conical angle (not shown) of each light guiding element 2 is also smaller than 80°, which can be appreciated by one having ordinary skill in the art.

According to the light guides of the first, second, third, and fourth embodiments according to the present invention, each light guiding element 2 includes a curved face 21 that can extend to form a conical surface. The curved face 21 can be the conical surface itself. Alternatively, the curved face 21 can be a part of the conical surface. The curved face 21 can be formed by cutting along a cross sectional face perpendicular to the central axis of the conical surface, such that the curved face 21 includes a top face 23. Alternatively, the curved face 21 can be cut along the central axis of the conical surface, such that the curved face 21 includes at least one cut face 24. Thus, the curved face 21 can be formed by arbitrarily cutting a portion of the conical surface. Since the curved face 21 can extend to form the conical surface, the curved face 21 still has the same reflecting effect as the whole conical surface, achieving the effects including improving uniform luminance distribution of the light emitting portion 12, reducing the illuminating angle of the light emitting portion 12, and reducing the light leakage rate of the light guide.

Figure 18:
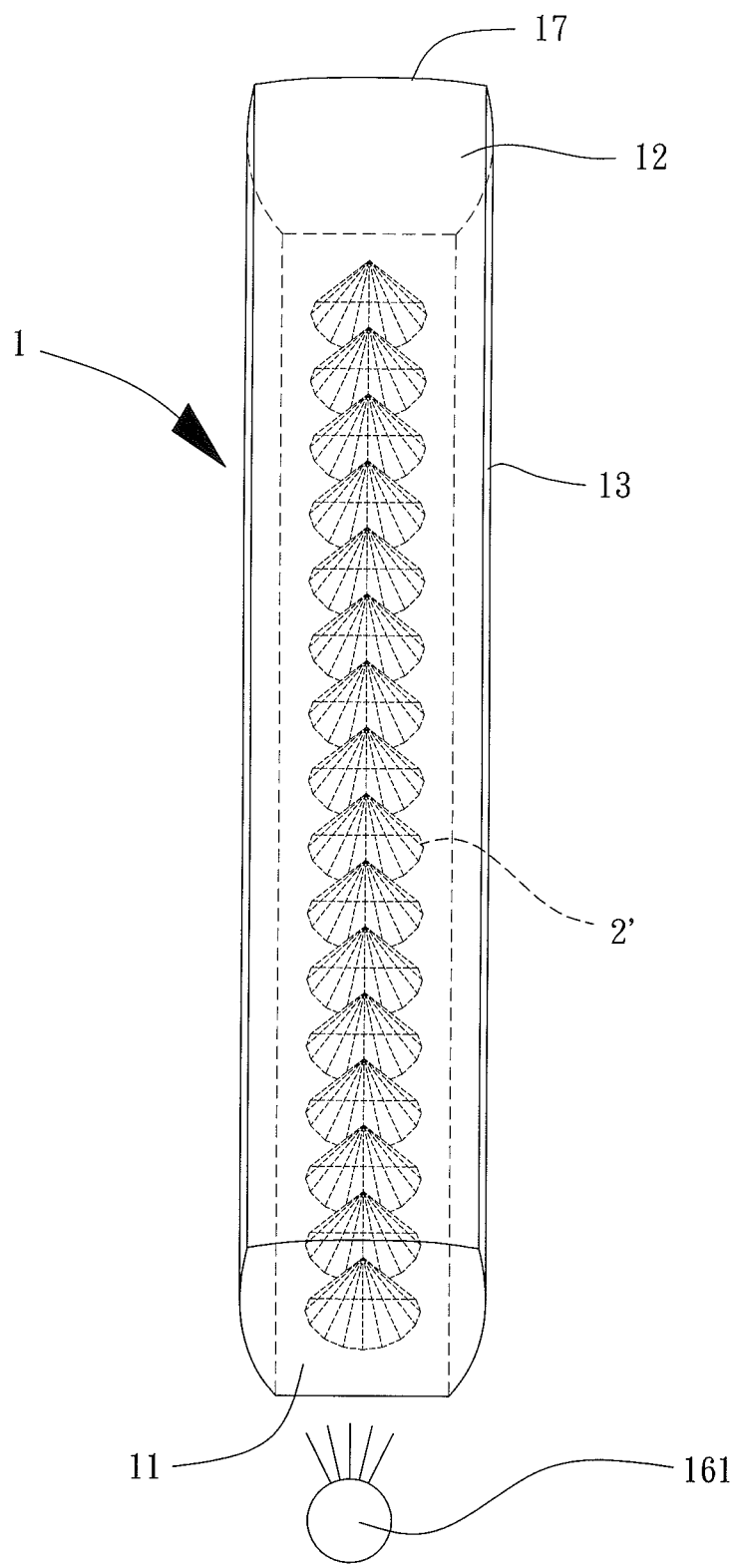
FIG. 18 is a schematic, perspective view of a light guide of a fifth embodiment according to the present invention.
Figure 19:
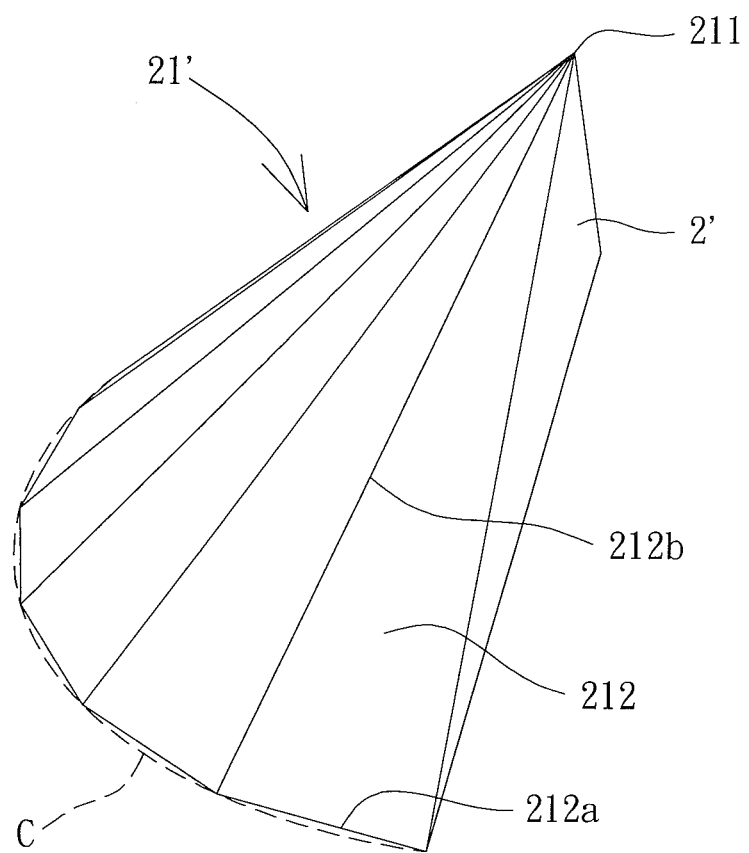
FIG. 19 is an enlarged, schematic, perspective view of a light guiding element of the light guide of the fifth embodiment according to the present invention.

FIGS. 18 and 19 show a light guide of a fifth embodiment according to the present invention. The fifth embodiment is different from the first, second, third, and fourth embodiments by that each light guiding element 2' of the fifth embodiment includes a light guiding face 21'. The light guiding face 21' is coupled to the deflecting portion 13 and has an apex 211. Nevertheless, the light guiding face 21' is comprised of a plurality of connecting faces 212. Specifically, each connecting face 212 includes a bottom side 212a and two sides 212b. The bottom side 212a has two ends respectively connected to the two sides 212b. An end of each side 212b distant to the bottom side 212a is connected to the apex 211. The bottom side 212a is a line passing through two points on an arc C. Two bottom sides 212a respectively of two adjacent connecting faces 212 are connected to each other. Thus, any two adjacent connecting faces 212 can be connected by the side 212b to form the light guiding face 21'.

Note that a group of lines each passing through the apex 211 and any point on the arc C can form a curved face that is a part of a conical surface. Since two bottom sides 212a respectively of two adjacent connecting faces 212 are connected to each other, the light guiding face 21' comprised by the connecting faces 212 approximates a curved face. Namely, the light guiding face 21' approximates a part of a conical surface. Thus, the light guiding face 21' of each light guiding element 2' of the fifth embodiment has a reflecting effect similar to the conical surface, such that the light guiding face 21' provides the same function as the curved faces 21 of the first, second, third, and fourth embodiments, which can be appreciated by one having ordinary skill in the art.

Figure 20:
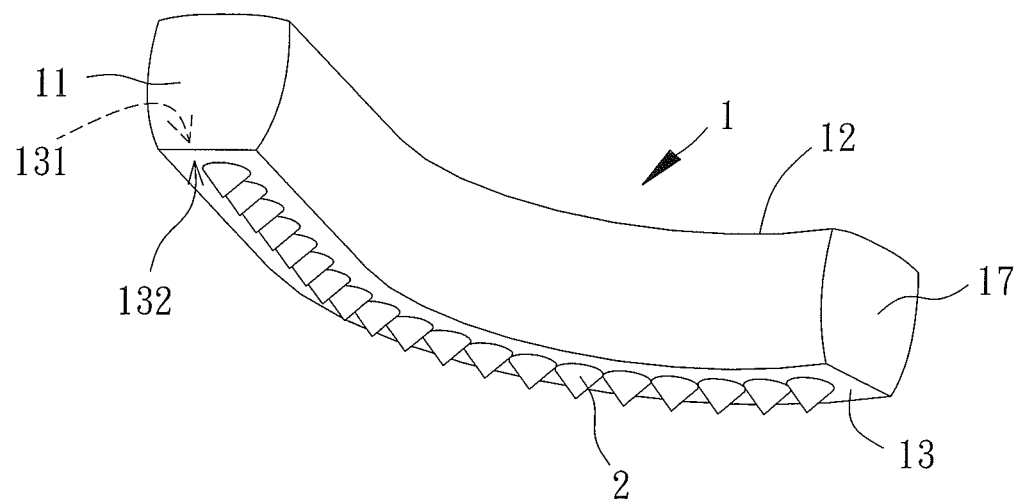
FIG. 20 is a schematic, perspective view of a light guide of an embodiment according to the present invention, with the light guiding elements of the light guide coupled to a face of a deflecting portion distant to a light emitting portion.

With reference to FIG. 20, although the light guiding elements 2 in the first, second, third, fourth, and fifth embodiments are coupled to the face 131 of the deflecting portion 13 facing the light emitting portion 12, the light guiding elements 2 of the light guide can be coupled to the face 132 of the deflecting portion 13 distant to the light emitting portion 12 in some embodiments of the light guide according to the present invention. According to the principle of optical reflection, the light guiding elements 2 of the light guide coupled to the face 132 of the deflecting portion 13 distant to the light emitting portion 12 can still achieve various effects of the above light guiding elements 2, 2' after many times of reflection, which is an application of optical principle that can be appreciated by one having ordinary skill in the art.

Figure 21:
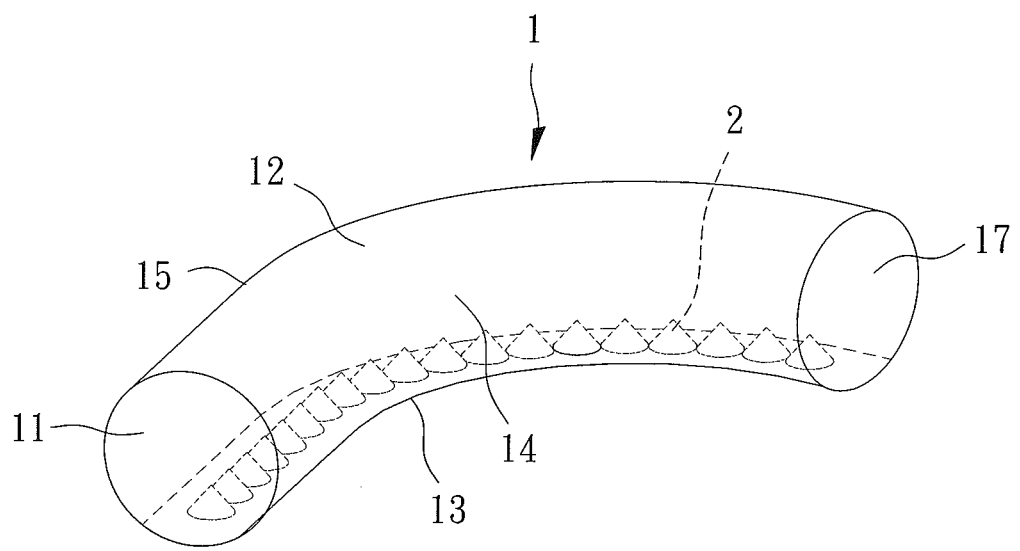
FIG. 21 is a schematic, perspective view illustrating an example of the body of the light guide of an embodiment according to the present invention in the form of a tubular structure having circular cross sections.

With reference to FIG. 21, although each of the light emitting portion 12, the deflecting portion 13, and the two lateral sides 14 and 15 in the first, second, third, fourth, and fifth embodiments is a plane or a curved face approximating a plane to form a tubular structure having rectangular cross sections, each of the light emitting portion 12, the deflecting portion 13, and the two lateral sides 14 and 15 can be arcuate, such that the light emitting portion 12, the deflecting portion 13, and the two lateral sides 14 and 15 can be connected to each other to form a tubular structure having circular cross sections in some embodiments of the light guide according to the present invention. The present invention is not limited to this.

Figure 22A:
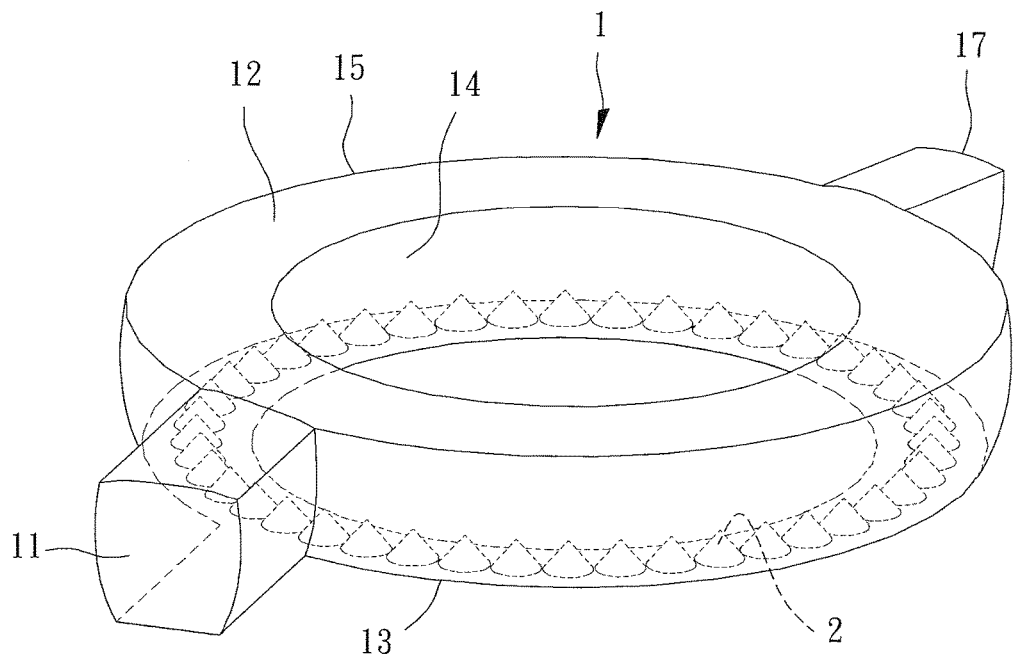
FIG. 22a is a schematic, perspective view illustrating another example of the body of the light guide of an embodiment according to the present invention in the form of a loop.

The body 1 in each of the first, second, third, fourth, and fifth embodiments is elongated, the body 1 can be in the form of a loop, and a channel can be provided to a section of the body 1 to form the first end face 11. With reference to FIG. 22*a*, in some embodiments of the light guide according to the present invention, the first end face 11 and the second end face 17 can be provided on two opposite sections of the body 1 to receive incident light rays from the light sources (not shown), which can be appreciated by one having ordinary skill in the art.

Figure 22B:
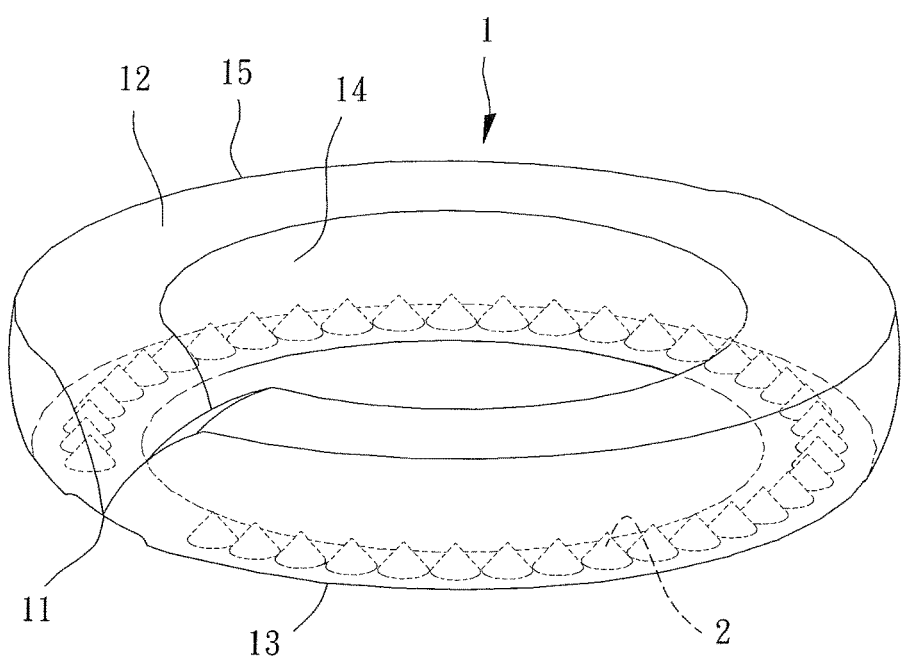
FIG. 22b is a schematic, perspective view illustrating a further example of the body of the light guide of an embodiment according to the present invention in the form of a loop.
Figure 23:
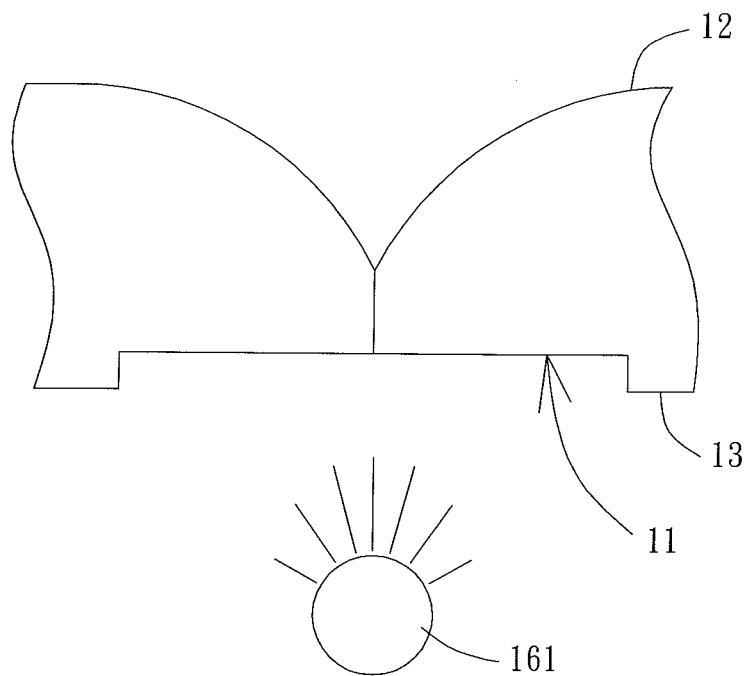
FIG. 23 is an enlarged, schematic, perspective view of a first end face of the light guide of an embodiment according to the present invention.

The first end face 11 in the first, second, third, fourth, and fifth embodiments is connected to the light emitting portion 12, the deflecting portion 13, and the two lateral sides 14 and 15, such that the light rays from the light source 161 transmit into the body 1 via the first end face 11 and also transmit to the light emitting portion 12, the deflecting portion 13, and the two lateral sides 14 and 15 at the same time. In the above embodiment, a channel can be provided to a section of the loop-shaped body 1 to form the first end face 11. With reference to FIG. 22*b*, in some embodiments of the light guide according to the present invention, the first end face 11 can be directly formed on the surface of the body 1, and the first end face 11 is merely connected to the deflecting portion 13 and the two lateral sides 14 and 15. FIG. 23 shows an enlarged view of the first end face 11. Specifically, the light emitting portion 12 can bend from the first end face 11 towards the deflecting portion 13. The first end face 11 is connected to the deflecting portion 13 and the two lateral sides 14 and 15 and forms a side of the body 1 opposite to the light emitting portion 12 (namely, the body 1 is formed on a side of the deflecting portion 13), such that the light rays from the light source 161 entering the body 1 via the first end face 11 only transmit to the light emitting portion 12 and the two lateral sides 14 and 15 to avoid potential problems of non-uniform luminance distribution resulting from direct incidence to the deflecting portion 13. Furthermore, since the light emitting portion 12 bends towards the deflecting portion 13, the light rays are prevented from directly transmitting through the body 1 due to an excessive incident angle from the first end face 11 to the light emitting portion 12.

Figure 24:
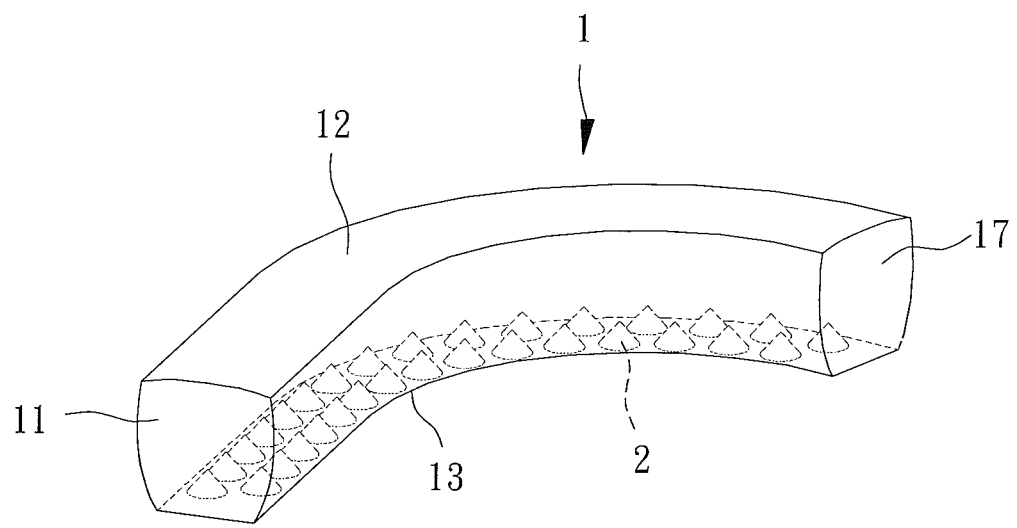
FIG. 24 is a schematic, perspective view illustrating another example of the light guiding elements of the light guide of an embodiment according to the present invention arranged in two rows.

The light guiding elements 2 in the first, second, third, fourth, and fifth embodiments are arranged on the deflecting portion 13 in a single row. With reference to FIG. 24, the light guiding elements 2 of the light guide can be arranged in two or more rows in some embodiments of the light guide according to the present invention. One of the light guiding elements 2 in one of the at least two rows can be aligned or misaligned with one of the light guiding elements 2 in another row, which can be appreciated by one having ordinary skill in the art.

Figure 25:
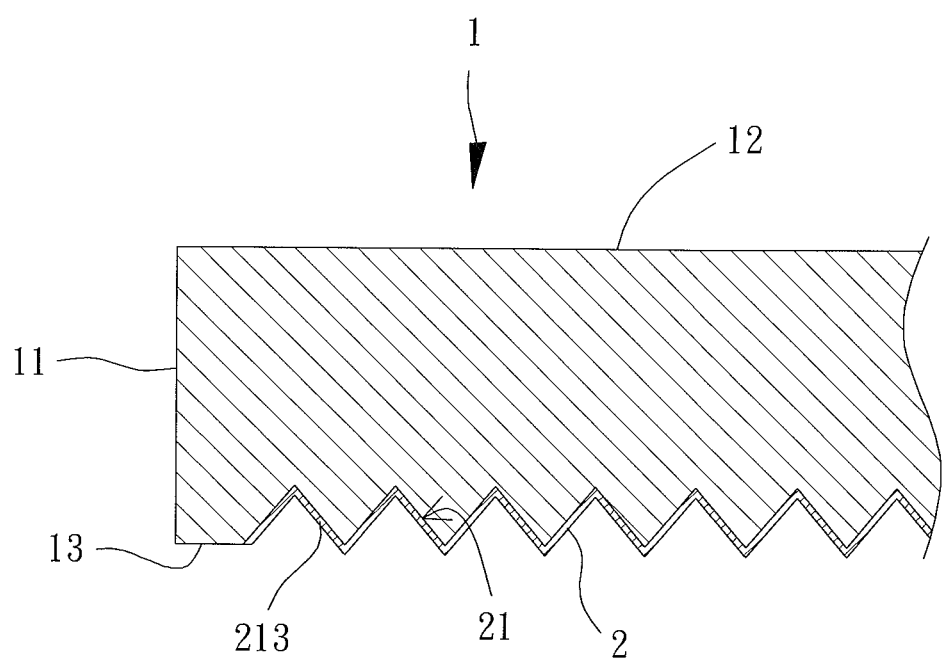
FIG. 25 is a schematic cross sectional view illustrating another example of the light guiding elements of the light guide of an embodiment according to the present invention, with each light guiding element having a reflective layer.

Note that the light guide of each embodiment according to the present invention utilizes the curved face 21 of each light guiding element 2 and the gaps between each light guiding element 2 and the two lateral sides 14 and 15 to increase the light receiving probability of the light guiding elements 2 distant to the first end face 11, effectively solving the disadvantage of non-uniform luminance distribution of the light emitting portion 93. Thus, the light guide of each embodiment according to the present invention does not have to use the secondary reflection to improve the luminance distribution of the light emitting portion 12. Namely, the light guide of each embodiment according to the present invention does not have to make the light sequentially pass through two sides of the conical surface of a light guiding element 2 for the purposes of transmitting the lighting guiding element 2 to another light guiding element 2. Accordingly, referring to FIG. 25, the curved face 21 of each light guiding element 2 can have a reflective layer 213 in some embodiments of the light guide according to the present invention. The reflective layer 213 can be provided on a side of the curved face 21 facing the light emitting portion 12. The reflective layer 213 can be a coating, polished surface, matte surface, reflective paint or texture, providing a deflecting or reflecting effect. Thus, the light reflecting effect of the curved face 21 can be further increased, and provision of the reflective layer 213 can avoid the deflecting portion 13.

In view of the above structural features, the main advantages of the embodiments of the light guide according to the present invention are that a plurality of light guiding elements 2 is arranged on the deflecting portion 13 of the body 1. Each, light guiding element 2 includes a curved face 21 and a bottom face 22 connected to the curved face 21 and the deflecting portion 13, and an apex 211 of the curved face 21 faces the light emitting portion 12, such that the curved face 21 of each light guiding element 2 and the gaps between each light guiding element 2 and the two lateral sides 14 and 15 can be utilized to increase the light receiving probability of the light guiding elements 2 distant to the first end face 11, effectively solving the disadvantage of non-uniform luminance distribution of the light emitting portion 93 in the conventional light guide and effectively increasing uniform luminance distribution of the light emitting portion 12.

Furthermore, light rays from different directions can be reflected by the light guiding elements 2, 2'. If the light rays deflect to the light emitting portion 12 and, thus, emit from the light emitting portion 12, each light ray is distributed around the central axis X2 of a corresponding light guiding element 2 by an angle of departure θa, θb, θc. Thus, the light output directions of the light rays can be controlled by using the direction of the central axis X2 of each light guiding element 2, such that the light output directions of the light rays are less likely to be adversely affected by the angle of the curved face 21 of each light guiding element 2, effectively reducing the illuminating angle of the light emitting portion 12.

Furthermore, the curved face 21 of each light guiding element 2 can extend to a location between the light guiding element 2 and the two lateral sides 14 and 15, such that the bottom face width W2 of the light guiding element 2 can be designed to be smaller than the width W13 of the deflecting portion 13. Thus, the light rays can transmit between the light guiding elements 2 and the two lateral sides 14 and 15, avoiding the disadvantage of the conventional light guide in which the light rays hitting an area of the first deflecting face 981 adjacent to the lateral side 96 could be deflected by the first deflecting face 981 to the lateral side 96 and be directly emitted to the outside of the body 9. Thus, the light guide according to the present invention indeed reduces the light leakage rate of the light guide.

In view of the foregoing, by providing the light guiding elements 2 with curved faces 21 on the deflecting portion 13, the light guides according to the present invention can direct the light rays from the light source to specific directions to solve the disadvantages of reduced light guiding efficiency resulting from non-uniform luminance distribution, larger illuminating angles, and light leakage.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A light guide comprising:
   a body transmittable to light, with the body including a first end face at an end thereof, with the body further including a light emitting portion, a deflecting portion, and two lateral sides, with the light emitting portion and the deflecting portion opposite to each other, with each of the two lateral sides connected to the light emitting portion and the deflecting portion, with the first end face connected to the deflecting portion and each of the two lateral sides; and
   a plurality of light guiding elements, with the plurality of light guiding elements arranged in a single line on the deflecting portion between and spaced from the two lateral sides, with a cross section of the body extending perpendicular to the single line extending through no more than one of the plurality of light guiding elements, with each of the plurality of light guiding elements including a curved face directly facing the two lateral sides, with the curved face being a conical surface or a part of the conical surface, with the curved face coupled to the deflecting portion, with the curved face including a portion connected to the deflecting portion, with the portion of the curved face extending along the deflecting portion and forming a bottom face, with the deflecting portion having a width between the two lateral sides, with the bottom face of each of the plurality of light guiding elements having a bottom face width in a direction perpendicular to the two lateral sides, with the bottom face width smaller than the width of the deflecting portion, with the plurality of light guiding elements including first, second, and third light guiding elements disposed in sequence,
   wherein the two lateral sides and the first, second, and third light guiding elements are configured with one of the two lateral sides deflecting at least a portion of a light ray hitting the curved face of the first light guiding element to hit the second light guiding element or the third light guiding element, and with the second light guiding element or the third light guiding element reflecting the deflected portion of the light ray to emit through the light emitting portion.

2. The light guide as claimed in claim 1, with the bottom face being a virtual or solid face, with the curved face connected to the bottom face, with each of the plurality of light guiding elements being a cone including the conical surface, with the curved face being the conical surface of the cone, and with the curved face including an apex facing the light emitting portion.

3. The light guide as claimed in claim 2, wherein each of the plurality of light guiding elements is a right circular cone, an oblique cone, or an elliptical cone.

4. The light guide as claimed in claim 1, with the bottom face being a virtual or solid face, with the curved face connected to the bottom face, with each of the plurality of light guiding elements further including a top face, with the curved face connected between the bottom face and the top face, with the curved face being a portion of the conical surface, and with the top face facing the deflecting portion.

5. The light guide as claimed in claim 4, with the curved face extending towards the light emitting portion beyond the top face to form the conical surface, and with the curved face having a virtual apex.

6. The light guide as claimed in claim 4, with the top face being a plane or a curved face or including a rounded angle.

7. The light guide as claimed in claim 1, with the bottom face being a virtual or solid face, with the curved face connected to the bottom face, with each of the plurality of light guiding elements further including a planar or concave face, with the curved face extending along the body and facing the first end face, with the curved face being a part of the conical surface including an apex, with the curved face including two edges connected to the apex, with the apex facing the light emitting portion, with the two edges located on two sides of the curved face, and with the planar or concave face connected to the two edges.

8. The light guide as claimed in claim 1, with the bottom face being a virtual or solid face, with the curved face connected to the bottom face, with each of the plurality of light guiding elements including a first planar face and a second planar face connected to the first planar face, with the curved face extending along the body towards the first end face, with the curved face being a part of the conical surface including an apex, with the curved face including two edges connected to the apex, with the apex facing the light emitting portion, with the two edges located on two sides of the curved face, with the first planar face connected to one of the two edges of the curved face, and with the second planar face connected to another of the two edges of the curved face.

9. The light guide as claimed in claim 8, with each of the first planar face and second planar face connected to the bottom face, and with an angle between the first planar face and the second planar face being in a range of 90-180°.

10. The light guide as claimed in claim 2, with a line passing through an apex of the curved face and a geometric center of the bottom face and forming a central axis, with a conical angle between the central axis and the curved face being smaller than 80°, with the apex of the curved face having a height from the bottom face, and with the height larger than 0.3 mm.

11. The light guide as claimed in claim 10, with the plurality of light guiding elements being different from each other in a direction of the central axis, the conical angle, the bottom face width, the height, or a spacing between two adjacent light guiding elements.

12. The light guide as claimed in claim 1, with the first end face receiving incident light rays from a light source, and with the light source facing the first end face, with the deflecting portion having a bottom side directly connected to each of the two lateral sides, with each of the plurality of light guiding elements further having a top, wherein the bottom face and the top of each of the plurality of light guiding elements are located between the light emitting portion and the bottom side of the deflecting portion.

13. The light guide as claimed in claim 1, with the deflecting portion including two opposite faces, with each of the plurality of light guiding elements located on one of the two opposite faces away from the light emitting portion.

14. The light guide as claimed in claim 1, with the plurality of light guiding elements arranged on the deflecting portion in at least two rows, and with one of the plurality of light guiding elements in one of the at least two rows being aligned or misaligned with another of the plurality of light guiding elements in another of the at least two rows.

15. The light guide as claimed in claim 1, wherein the curved face of each of the plurality of light guiding elements includes a reflective layer.

16. A light guide comprising:
a body transmittable to light, with the body including a first end face at an end thereof, with the body further including a light emitting portion, a deflecting portion, and two lateral sides, with the light emitting portion and the deflecting portion opposite to each other, with each of the two lateral sides connected to the light emitting portion and the deflecting portion, with the first end face connected to the deflecting portion and each of the two lateral sides; and
a plurality of light guiding elements, with the plurality of light guiding elements arranged in a single line on the deflecting portion between and spaced from the two lateral sides, with a cross section of the body extending perpendicular to the single line extending through no more than one of the plurality of light guiding elements, with each of the plurality of light guiding elements including a light guiding face directly facing the two lateral sides, with the light guiding face having an apex, with the light guiding face comprised of at least three connecting faces, with each of the at least three connecting faces including a bottom side and two sides, with the bottom side having two ends respectively connected to the two sides, with each of the two sides having an end located distant to the bottom side and connected to the apex, with the bottom side being a line passing through two points on an arc, with two bottom sides respectively of two adjacent connecting faces of the at least three connecting faces connected to each other, and with the light guiding face coupled to the deflecting portion.

17. The light guide claimed in claim 1, wherein the body includes a second end face at another end opposite to the end where the first end face is arranged at, wherein the second end face is connected to the deflecting portion and each of the two lateral sides, and wherein the single line extends from the first end face to the second end face.

18. The light guide as claimed in claim 17, wherein the light emitting portion is curved.

19. A light guide comprising:
a body transmittable to light, with the body including a first end face on an end thereof, with the body further including a light emitting portion, a deflecting portion, and two lateral sides, with the light emitting portion and the deflecting portion opposite to each other, with each of the two lateral sides directly connected to the light emitting portion and a bottom side of the deflecting portion, with the first end face connected to the deflecting portion and each of the two lateral sides; and
with the light guide further consisting of a plurality of light guiding elements arranged in a single line or in two lines on the deflecting portion between the two lateral sides, with each of the plurality of light guiding elements including a curved face, with the curved face directly facing at least one of the two lateral sides, with the curved face being a conical surface or a part of the conical surface and having a top, and with the curved face coupled to the deflecting portion, with the curved face including a portion connected to the deflecting portion, with the portion of the curved face extending along the deflecting portion and forming a bottom face, wherein the bottom face and the top of each of the plurality of light guiding elements are located between the light emitting portion and the bottom side of the deflecting portion.

20. The light guide as claimed in claim 19, wherein a cross section of the body extending perpendicular to the single line or two lines does not pass through another light guiding element.

* * * * *